US008452779B1

(12) United States Patent
Kelley et al.

(10) Patent No.: US 8,452,779 B1
(45) Date of Patent: May 28, 2013

(54) METHODS AND SYSTEM FOR TARGETED CONTENT DELIVERY

(75) Inventors: Jeremy Donald Kelley, College Station, TX (US); David Walter Birch, College Station, TX (US); Omar Besim Hakim, Austin, TX (US)

(73) Assignee: Collective Labs, LLC, College Station, TX (US)

( * ) Notice: Subject to any disclaimer, the term of this patent is extended or adjusted under 35 U.S.C. 154(b) by 0 days.

(21) Appl. No.: 13/179,088

(22) Filed: Jul. 8, 2011

Related U.S. Application Data

(60) Provisional application No. 61/399,231, filed on Jul. 9, 2010.

(51) Int. Cl.
*G06F 17/30* (2006.01)

(52) U.S. Cl.
CPC ............................... *G06F 17/30864* (2013.01)
USPC .......................................... 707/748; 707/736

(58) Field of Classification Search
CPC ................................................ G06F 17/30864
USPC ............................................................ 707/748
See application file for complete search history.

(56) References Cited

U.S. PATENT DOCUMENTS

| | | | |
|---|---|---|---|
| 6,487,584 B1 * | 11/2002 | Bunney .......................... | 709/206 |
| 6,529,956 B1 * | 3/2003 | Smith et al. .................... | 709/229 |
| 6,721,744 B1 * | 4/2004 | Naimark et al. ...................... | 1/1 |
| 6,839,680 B1 | 1/2005 | Liu et al. | |
| 7,260,783 B1 * | 8/2007 | Mika ............................. | 715/748 |
| 7,395,314 B2 * | 7/2008 | Smith et al. ................... | 709/206 |
| 7,483,525 B2 * | 1/2009 | Chaddha et al. ......... | 379/142.07 |
| 7,685,191 B1 | 3/2010 | Zwicky et al. | |
| 7,904,448 B2 | 3/2011 | Chung et al. | |
| 7,958,228 B2 | 6/2011 | Riise et al. | |
| 2002/0198944 A1 * | 12/2002 | Moss ............................. | 709/206 |
| 2007/0143260 A1 * | 6/2007 | Markov et al. ..................... | 707/3 |
| 2008/0065759 A1 * | 3/2008 | Gassewitz et al. ............. | 709/224 |
| 2008/0140674 A1 * | 6/2008 | Ishikawa .......................... | 707/10 |
| 2008/0205602 A1 * | 8/2008 | Bishop ....................... | 379/88.12 |
| 2008/0275772 A1 * | 11/2008 | Suryanarayana et al. ...... | 705/14 |
| 2008/0301563 A1 * | 12/2008 | Bellamy et al. ................ | 715/738 |

(Continued)

OTHER PUBLICATIONS

Cyrus Shahabi, et al., "Knowledge Discovery from Users Web-Page Navigation," In Proceedings of workshop on research issues in Data engineering, Apr. 7, 1997, 10 pages.

*Primary Examiner* — Miranda Le
(74) *Attorney, Agent, or Firm* — Stephen A. Mason; Meyertons, Hood, Kivlin, Kowert & Goetzel, P.C.

(57) ABSTRACT

Methods and apparatus for targeted message delivery are disclosed. A set of document delivery transactions are initiated with respect to a set of intended document recipients. The initiating includes sending to each of the set of intended document recipients a respective one of a set of URLs for requesting delivery of one or more documents designated with respect to a respective document delivery transaction. Each of the set of URLs is identified with a respective one of the set of intended document recipients. In response to actuations of respective ones of the set of URLs, the one or more documents designated with respect to the respective document delivery transaction are delivered from a centralized document repository. Analytic measures are recorded with respect to the delivering the one or more documents. The analytic measures include a measure of actuations of each of the URLs. A target for a subsequent communication is identified.

15 Claims, 14 Drawing Sheets

U.S. PATENT DOCUMENTS

2009/0187593 A1* 7/2009 Chen et al. ................. 707/104.1
2010/0010898 A1* 1/2010 Matsumoto ................ 705/14.58
2011/0208836 A1* 8/2011 O'Fallon et al. ............... 709/219
2011/0264992 A1* 10/2011 Vishria et al. ................. 715/208

* cited by examiner

METHODS AND SYSTEM FOR TARGETED CONTENT DELIVERY

CLAIM OF PRIORITY TO PROVISIONAL APPLICATION

This application claims benefit of priority of U.S. Provisional Application Ser. No. 61/399,231 entitled "Simplified Content Dissemination To Recipients Acquired Via External Means" filed Jul. 9, 2010, the content of which is incorporated by reference herein in its entirety.

BACKGROUND

Description of the Related Art

The conventional paradigm for delivering marketing materials concentrates on mono-directional communication. After discovery of the initial interest of a new contact, information is distributed to the contact with limited opportunity for feedback. This pattern of mono-directional communication transcends media, asserting itself from the trade show floor to the website. In the trade-show example, the most conventional delivery of marketing material involves a booth attendant handing a brochure to a contact.

Alternatively, in a slightly more technologically sophisticated iteration of delivery of marketing material, the booth attendant solicits an email address from a potential recipient and sends a document by electronic mail. While an email-based delivery paradigm does open a channel for subsequent communication to the user, an email-based delivery paradigm maintains a mono-directional line of communication.

The most technologically advanced paradigm for mono-directional communication currently available is the distribution of web pages. A user is able to place a web page on a server and receive requests that the page be sent. While the web-based paradigm does generate limited identity information with respect to a requesting party, a web-based delivery paradigm maintains a mono-directional line of communication.

SUMMARY

Various embodiments of methods and apparatus for targeted message delivery are disclosed. A set of document delivery transactions are initiated with respect to a set of intended document recipients. The initiating includes sending to each of the set of intended document recipients a respective one of a set of pointers for requesting delivery of one or more documents designated with respect to a respective document delivery transaction. Each of the set of pointers is identified with a respective one of the set of intended document recipients. In response to actuations of respective ones of the set of pointers, the one or more documents designated with respect to the respective document delivery transaction are delivered from a centralized document repository. Analytic measures are recorded with respect to the delivering the one or more documents. The analytic measures include a measure of actuations of each of the pointers. A target for a subsequent communication is identified.

Figure 1:
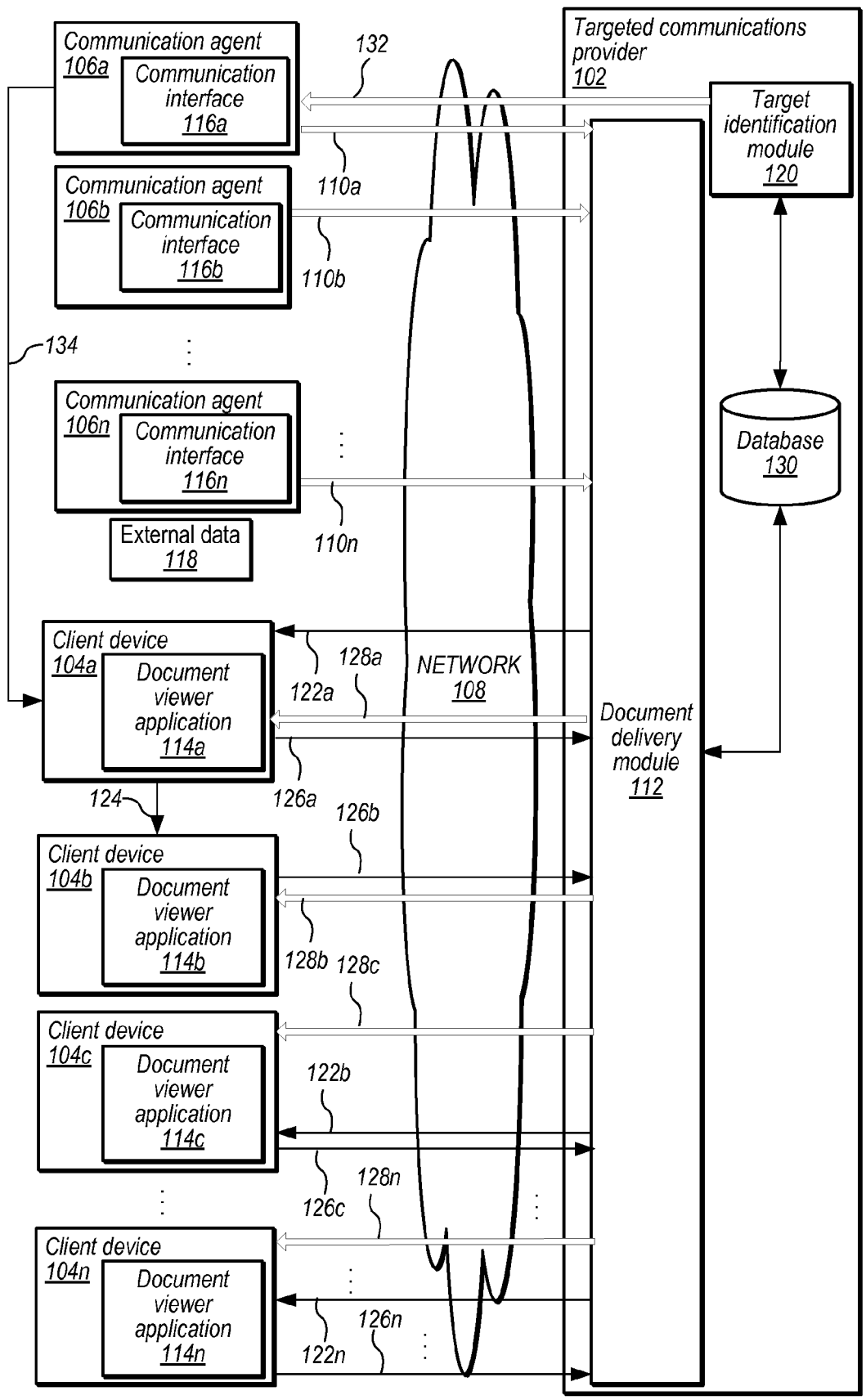
FIG. 1 depicts a system for targeted message delivery, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. For example, where flowcharts are used below to describe a series of operations that may be performed by embodiments, one of skill in the art will readily realize in light of having read the present disclosure that various operations may be omitted, or other operations may be added, or the order of operations may be varied without departing from the scope and intent of the embodiments presented herein. Likewise, one of skill in the art will readily realize in light of having read the present disclosure that, in diagrams with respect to which software or hardware modules are discussed, that various modules may be omitted, or other modules may be added, or the placement of modules and operations in various systems may be varied from the forms discussed without departing from the scope and intent of the embodiments presented herein.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

DEFINITIONS

As used herein, a document delivery transaction is, unless otherwise noted where used, a transaction in which a pointer for requesting delivery is generated and associated with identifying information of an intended document recipient.

As used herein, an intended document recipient is, unless otherwise noted where used, an identity associated with an item of contact information. In some embodiments, an intended document recipient is recorded in a contact record of a contact records data store and is associated with a pointer for requesting document delivery that is transmitted to the intended document recipient.

As used herein, a pointer for requesting delivery is, unless otherwise noted where used, an instruction or addressing value used to initiate, encourage, or complete a transaction involving delivery of a document to an intended recipient. Examples of a pointer for requesting delivery include but are not limited to a uniform resource identifier (URI) associated with a contact record and providing a location of a document intended for delivery to the intended recipient. As discussed below, in some embodiments, delivery further includes a physical delivery of a physical embodiment of a document. As discussed below, in some embodiments, delivery further includes transmission of video and/or audio content, such as by streaming or by physical transport of a tangible medium containing a such video and/or audio content.

As used herein, a document designated with respect to a respective document delivery transaction, unless otherwise noted where used, is a document intended to be transmitted to an intended recipient.

As used herein, an actuation of a pointer is, unless otherwise noted where used, an activity that results in sending a request for a document designated with respect to a respective document delivery transaction. Examples of actuation of a pointer can include clicking on a link to download a document, sending an email, sending a message using short message service (SMS), sending alternative forms of text messaging, entering a code into a keypad, uttering voice commands, sending messages using social messaging interfaces such as Tweets™ or Facebook™ messages or other message types containing a unique document delivery code, or performing another activity intended to stimulate automated delivery of a document to a user.

As used herein, a centralized document repository is, unless otherwise noted where used, a server or series of servers for storing and delivering documents to users in response to the actuation of pointers, as described above. As used herein, such a server or series of servers may be a single machine or may take the form of instructions executing on a distributed computing system or cloud.

As used herein, an analytic measure is, unless otherwise noted where used, data, measurement or statistical analysis for tracking user interaction with a document. Analytic measures provide information about the number of entities requesting a document and the number of document views, as well as providing information about the behavior of viewers while they are viewing the document. Other examples of analytic measures are hybrids of information directly related to document view behavior with information regarding related commercial behavior. Examples include "conversion efficiency" as described below.

As used herein, a ranking of a plurality of intended document recipients with respect to analytic measures is, unless otherwise noted where used, any process of comparing a value of an analytic measure describing a first user or document to a value of the analytic measure describing a second user or document.

As used herein, a target for subsequent communication is, unless otherwise noted where used, an identity associated with an item of contact information to which a subsequent communication is to be routed based on values of analytic measures.

As used herein, alerting a communication agent to an identity of a target for subsequent communication is, unless otherwise noted where used, any process of prompting a communication agent to initiate a communication to a target for subsequent communication.

As used herein, initiating a subsequent communication is, unless otherwise noted where used, the automated preparation or transmission of a customized message to a target.

As used herein, a transaction conversion is, unless otherwise noted where used, a commercial transaction linked to a document delivery transaction. In some embodiments, the commercial transaction will be an electronic commerce transaction. In other embodiments, the commercial transaction will be a transaction completed through conventional commerce. In some embodiments, embodiments will sometimes maintain a linkage between a commercial transaction and a document delivery transaction through identities associated with an item of contact information.

As used herein, a conversion efficiency is, unless otherwise noted where used, a measure of the frequency with which a document or a subsequent communication results in a transaction conversion. Examples of conversion efficiency include but are not limited to ratios of pointers sent to transaction conversions, ratios of documents delivered to transaction conversions, ratios of subsequent communications to transaction conversions, any of which may be customized to identify the performance of particular documents or document versions, communication agents, communication channels, or the influence of demographic or external factors.

As used herein, a communication agent is, unless otherwise noted where used, an entity or computer program used to prepare, initiate or transmit a communication to a target for subsequent communication.

As used herein, a distinct computing device is, unless otherwise noted where used, a separate user account, computing instance, user identity, MAC address or IP address identifiably distinct from another user account, computing instance, phone number, user identity, MAC address or IP address performing an actuation of a pointer.

As used herein, a particular user is, unless otherwise noted where used, a separate user account, computing instance, phone number, person, unique individual, user identity, MAC address or IP address identifiably distinct from another user account, computing instance, phone number, user identity, MAC address or IP address performing an actuation of a pointer.

As used herein, rates at which respective ones of the plurality of pointers for requesting delivery of one or more documents are transmitted are, unless otherwise noted where used, measures of the frequency, rate, or relative or absolute number of transmissions of respective ones of the plurality of pointers. In some embodiments, rates indicate time-based frequencies. In other embodiments, rates indicate ratio as a fraction of a total sample.

As used herein, a delivery efficiency is, unless otherwise noted where used, a measure of the frequency with which or length of elapsed time until a document is delivered after transmission a pointer.

As used herein, a length of time recorded with respect to an actuation is at least one of a length of time that a document was viewed, a length of time transpiring between delivery of a pointer and forwarding of a pointer by a pointer recipient, a length of time transpiring between delivery of a pointer and actuation of a pointer, or a length of time between delivery of a pointer and transaction conversion.

As used herein, delivery confirmation includes but is not limited to confirmation of physical delivery, confirmation of a download, or confirmation of viewing a portion of a document.

Introduction to One Embodiment of Targeted Message Delivery

Embodiments provide systems and methods for targeted message delivery. A plurality of document delivery transactions are initiated with respect to a plurality of intended document recipients. In some embodiments, initiating the document delivery transactions occurs through manual entry of contact information for one or more intended recipients for each of the plurality of document delivery transactions. In other embodiments, an automated document delivery transaction initiation option is available to receive data in a pre-configured format, such as a physical business card or a v-card, extract contact and identity information, and automatically initiate the document delivery transactions based on the contact and identity information, as well as a set of pre-configured characteristics for automatically triggering initiation.

Some embodiments include a means performing targeted message delivery. For example, a targeted message delivery system may receive input identifying intended document recipients, communicate pointers to the intended document recipients, and target subsequent communications to the intended document recipients based on analytic data resulting from actuations of the pointers. A document delivery module or a target identification module is in some embodiments implemented by a non-transitory, computer-readable storage medium and one or more processors (e.g., CPUs) of a computing apparatus. The computer-readable storage medium stores, in some embodiments, program instructions executable by the one or more processors to cause the computing apparatus to perform receiving input identifying intended document recipients, communicating pointers to the intended document recipients, and targeting subsequent communications to the intended document recipients based on analytic data resulting from actuations of the pointers. Other embodiments of the document delivery module and target identification module are at least partially implemented by hardware circuitry and/or firmware stored, for example, in a non-volatile memory.

A pointer is sent to each of the intended document recipients at an address or other item of contact information. The pointer provides an instruction or addressing value used to initiate, encourage, or complete a transaction involving delivery of a document to an intended recipient. In response to actuations of pointers, documents designated with respect to respective document delivery transactions are delivered from a centralized document repository. Analytic measures with respect to document delivery are recorded. In some embodiments, the analytic measures include various measure of actuations of each of the plurality of pointers. Using the analytic measures, a target is identified for a subsequent communication. In some embodiments, targets are identified based on a ranking with respect to one or more of the analytic measures.

FIG. 1 depicts a system for targeted message delivery, according to one embodiment. In a targeted communications system, a targeted communications provider 102 interacts with client devices 104a-104n and communication agents 106a-106n over a network 108.

As used herein, the notation xxxa-xxxn indicates a flexibly variable quantity of a specified item, such as client devices 104a-104n, and the presence of differently numbered devices bearing the same reference letter (e.g., 104a and 106a), may but does not necessarily indicate any correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'n$^{th}$' member of a different plurality, though they may correspond. Further, for simplicity in the following figures, an arrow indicating a communication between modules, processes, or functions may indicate a series of non-identical communications serving different purposes and containing different information in disparate formats.

In one embodiment, communication agents 106a-106n send initiation requests 110a-110n to a document delivery module 112 of targeted communications provider 102. Each of communication agents 106a-106n is a data processing system or program used to prepare, initiate or transmit a communication to a target (or potential target) for subsequent communication. Some embodiments of communication agents 106a-106n perform "downstream" functions in which communication agents 106a-106n are used to prepare and transmit a targeted communication 134 to a target (or potential target) for subsequent communication. Additionally, some embodiments of communication agents 106a-106n perform "upstream" functions in which communication agents 106a-106n are used to prepare and send initiation requests 110a-110n to a targeted communications provider 102.

As depicted in FIG. 1, each of communication agents 106a-106n performs an upstream function of sending initiation requests 110a-110n. In one embodiment, communication interfaces 116a-116n are used to receive contact information with respect to identities of intended document recipients and to send that contact information with respect to the identities of the intended document recipients to document delivery module 112 as part of initiation requests 110a-110n.

As one of ordinary skill in the art will readily understand in light of having read the present disclosure, features and capabilities of communication agents 106a-106n and communication interfaces 116a-116n vary between embodiments without departing from the scope and intent of the embodiments disclosed herein. In one embodiment, communication agents 106a are deployed as programs presenting free-standing communication interfaces 116a-116n while executing on conventional data processing systems or terminals, such as that discussed below with respect to FIG. 10. In another embodiment, communication agents 106a-106n are deployed as programs presenting free-standing communication interfaces 116a-116n while executing on mobile data processing systems, such as a tablet computer or mobile telephone, which will also contain many of the components discussed below with respect to FIG. 10. In yet another embodiment, communication agents 106a-106n are deployed as web pages presenting a form for use as a communication interfaces 116a-116n within a browser window (not shown) of a browser (not shown).

Functions of communication agents 106a-106n and communication interfaces 116a-116n likewise vary between embodiments without departing from the scope and intent of the embodiments disclosed herein. For example, in some embodiments, communication interface 116a presents a form for manual entry of contact information with respect to an identity of an intended document recipient through a touch screen or keyboard. In other embodiments, communication interface 116n provides commands for communication agent 106n to read external data 118, such as a printed business card, an RFID tag, a barcode off of an identification tag, a QR code encoding contact information, or a vcard transmitted through electromagnetic signals (e.g., infra-red or radio frequency emissions from a portable digital assistant).

Embodiments of communication interfaces 116a-116n also present varying levels of automation with respect to the intake of contact information and the transmission of initiation requests 110a-110n without departing from the scope and intent of the embodiments disclosed herein. For example, in some embodiments, communication agents 116a-116n are pre-configured, prior to entry or retrieval of contact information with respect to the identity of the intended document recipient, to automatically send initiation requests 110a-110n upon receipt of contact information with respect to the identities of the intended document recipients. Such a pre-configuration will, in some embodiments, include designating documents for a document delivery transaction to be associated with contact information with respect to the identity of the intended document recipient contained in such automatically sent initiation requests. In other embodiments, users of communication interfaces 116a-116n are able to edit contact information with respect to the identity of the intended document recipient, designate documents for a document delivery transaction to be associated with contact information with respect to the identity of the intended document recipient, and otherwise control the content and transmission of initiation requests 110a-110n, as well as the results of initiation requests 110a-110n.

In some embodiments, upon receipt of initiation requests 110a-110n, document delivery module 112 will initiate a plurality of document delivery transactions with respect to a plurality of intended document recipients identified in initiation requests 110a-110n. In some embodiments, the initiating includes sending over network 108 to each of the plurality of intended document recipients (e.g., users of client devices 104a, 104c, 104n) a respective one of a plurality of pointers 122a-122n for requesting delivery of one or more documents designated with respect to a respective document delivery transaction. Each of the plurality of pointers 122a-122n is identified with a respective one of the plurality of intended document recipients indicated in initiation requests 110a-110n. Each of the plurality of pointers 122a-122n is an instruction or addressing value used to initiate, encourage, or complete a transaction involving delivery of a document to an intended recipient. Examples of pointers 122a-122n for requesting delivery include a uniform resource identifier (URI) associated with a contact record and providing a location of a document intended for delivery to the intended recipient.

Network 108 may include any channel for providing effective communication between each of the entities of targeted communications provider 102. In some embodiments, network 108 includes an electronic communication network, such as the internet, a local area network (LAN), a cellular communications network, or the like. Network 108 may include a single network or combination of networks that facilitate communication between each of the entities (e.g., communication agents 106a-106n, client devices 104a-104n and targeted communication provider 102).

In some embodiments, one or more of pointers 122a-122n may be forwarded between client devices 104a-104n. For example, client device 104a forwards a pointer 124 to client device 104b. While client device 104b is not an intended recipient of one of pointers 122a-122n, client device 140b may, in some embodiments, use forwarded pointer 124 to request a document delivery and analytics may be compiled based on the transmission of forwarded pointer 124 and subsequent use to request delivery. Examples of metrics enabled by tracking of forwarded pointer 124 include forwarding frequency ratios, measures of virality (e.g., number of forwards, forwards per intended recipient, repeat forwards), and time metrics (e.g. time to forward, time from forward to request), among others, which may be used to identify a potential target for subsequent communications or to rank targets for subsequent communications.

In some embodiments, client devices 104a-104n request documents 128a-128n for viewing in document viewer applications 114a-114n by sending requests 126a-126n to document delivery module 112. In some embodiments, sending requests 126a-126n is accomplished through actuation of respective ones of the plurality of pointers 122a-122n or forwarded pointer 124. In response to actuations of respective ones of the plurality of pointers 122a-122n or forwarded pointer 124, document delivery module 112 delivers the one or more documents 128a-128n designated with respect to the respective document delivery transaction from a centralized document repository. In some embodiments, the centralized document repository is a database 130 associated with document delivery module 112. In other embodiments, document delivery module 112 includes the centralized document repository.

In some embodiments, document delivery module 112 records analytic measures with respect to the delivering the one or more documents 128a-128n and/or their viewing in document viewer applications 114a-114n. The analytic measures include a measure of actuations of each of the plurality of pointers 122a-122n, and some embodiments include measures related to behavior of document viewer applications 114a-114n. In some embodiments, a target identification module 120 ranks the plurality of intended document recipients (e.g., client devices 104a-104n) with respect to the analytic measures. Target identification module 120 identifies a target (e.g., client 104a) for a subsequent communication 134 based on the ranking. In some embodiments, target identification module 120 alerts one or more of communication agents 106a-106n of the identity of a target for a subsequent communication by sending a target of subsequent communication alert 132 one or more of communication agents 106a-106n, which may then initiate subsequent communication 134.

Introduction to Document Analytics

Target identification module 120 and document delivery module 112 may include analytics modules (shown in FIGS. 2A-2B) for the collection and processing of analytics data, and the generation of corresponding document metrics (e.g., document requests, document views, repeated document views by a user, length of document views, document downloads, first document requests, document viewers, unique document viewers, repeat document viewers, new document viewers, exit percentages for particular documents or portions of a document, visibility time for a document or portion of a document, viewing session duration for a document or section of a document, document view duration, time on page or section of document, active time of document, engagement time for document viewer applications 114a-114n, document view depth, document page views per session), analytics reports including various metrics of the document analytics data and data describing behavior external to the documents (e.g., document conversion efficiencies and/or subsequent communication conversion efficiency). Analytics data may include data that describes usage and request patterns for documents 128a-128n and/or individual pages within the documents 128a-128n. As used herein, the term analytics data is interchangeable with the term analytic measures.

Analytics data 128a-128n may include information relating to the activity and interactions of one or more users with a given one of documents 128a-128n or portions of given documents 128a-128n. For example, analytics data may include historic and/or current document request and viewing information for one or more intended recipients, including, but not limited to identification of documents 128a-128n requested, identification of documents 128a-128n viewed, identification of conversions (e.g., desired actions taken—such as the purchase of an item) in response to being sent a particular one or more of documents 128a-128n, number of purchases associated with one or more of documents 128a-128n, value of purchases associated with one or more of documents 128a-128n, and other data that may help gauge user interactions with documents 128a-128n.

In some embodiments, document analytics data includes information indicative of a location of one of client devices 104a-104n. For example, analytics data may include location data indicative of a geographic location of one of client devices 104a-104n. In some embodiments, location data may be correlated with corresponding user activity, such as viewing one of documents 128a-128n. For example, a set of received analytics data may include information regarding a user's interaction activity with a document page (e.g., request and viewing) and corresponding location data indicative of a location of the respective one of client devices 104a-104n at the time of the activity. Thus, in some embodiments, analytics data can be used to assess a user's activity with respect to a document and the corresponding location of the user during the activities. In some embodiments, location data includes geographic location information. For example, location data may include an indication of the geographic coordinates (e.g., latitude and longitude coordinates), IP address or the like or a user of one or more of client devices 104a-104n.

In some embodiments, document analytics data is accumulated over time to generate a set of analytics data (e.g., a document analytics dataset) that is representative of activity and interactions of one or more users with a given document or set of documents. For example, a document analytics dataset may include document analytics data associated with all document delivery transactions and their respective pointers 122a-122n. Document analytics data may be processed to generate document metric values or other analytic measures that are indicative of a particular trait or characteristic of the document (e.g., a number of requests 126a-126n, a number of document views for a particular one of documents 128a-128n, a number of items purchased in response to views of a particular one of documents 128a-128n, value of items purchased in response to views of a particular one of documents 128a-128n, a conversion rate for a particular one of documents 128a-128n, a promotion effectiveness index rate for a particular one of documents 128a-128n, etc.).

Additionally, document analytics data may track the relationships between documents 128a-128n and targeted subsequent communications 134. For example, a document analytics dataset may include document analytics data associated with all document delivery transactions and their respective subsequent communications. Document analytics data may be processed to generate document metric values that are indicative of a particular trait or characteristic of a subsequent targeted communication (e.g., a number of requests 126a-126n after the subsequent targeted communication, a number of document views for a particular one of documents 128a-128n after the targeted subsequent communication, a number of items purchased in response to a targeted subsequent communication, value of items purchased in response to targeted subsequent communications, a conversion rate for a particular one of a group of communication agents sending targeted subsequent communications, a promotion effectiveness index rate for a particular one of the communication agents or a user of the communication agent, etc.).

Targeted communications provider 102 divides, in some embodiments, the processing and analysis of metrics between target identification module 120 and document delivery module 112, such that each of target identification module 120 and document delivery module 112 performs different functions, generates different metrics, or is otherwise functionally distinct. Other embodiments do not preserve such distinctions and one of skill in the art will readily realize in light of having read the present disclosure that various embodiments locate various functions in one or the other of target identification module 120 and document delivery module 112 or in separate modules or systems without departing from the scope and intent of the embodiments disclosed herein.

In some embodiments, targeted communications provider 102 may include computer executable code (e.g., executable software modules) stored on a computer readable storage medium that is executable by a computer to provide associated processing. In some embodiments, any of the functions of targeted communications provider 102, client devices 104a-104n, and communication agents 106a-106n may be executed by distinct computing systems or on distributed computing systems, such as a computing cloud.

Document delivery module 112 may service multiple requests 122a-122n from one or more client devices 104a-104n with respect to a single one of documents 128a-128n. For example, upon loading/rendering of a document 128a by a document viewer application 114a of client device 104a, document viewer application 114a may generate a second request 122a to document delivery module 112 via network 108. Document delivery module 112 may process the request and return appropriate content (e.g., an image embedded within document 128a) to document viewer application 114a of client device 104a. In some embodiments, the request 128a includes a request for an image, and document delivery module 112 simply returns a single transparent pixel for display by document viewer application 114a of client device 104a, thereby fulfilling the request 128a. The request 128a itself may also include document analytics data embedded therein.

Some embodiments support document delivery module 112 embedding or otherwise providing pointers 122a-122n to resources, known as "bugs", within documents 128a-128n provided to client devices 104a-104n. The resources may be invisible a user, such as a transparent one-pixel image for display in a document. The pointers 122a-122n may direct document viewer applications 114a-114n of client device 104a-104n to request the resources from document delivery module 112. Document delivery module 112 may record the requests and any additional information associated with the request (e.g., the date and time, and/or identifying information that may be encoded in the resource request).

In some embodiments, requests 126a-126n may include codes/strings that are indicative of document analytics data, such as data about a user/client, the user's computer, the content of the document that has been viewed, or any other document analytics data that is accessible and of interest. A request for an image may include, for example, "image.gif/XXX . . . " wherein the string "XXX . . . " is indicative of the document analytics data. For example, the string "XXX" may include information regarding user interaction with a document (e.g., activity data, such as a page of a document that is viewed, or a noise level recorded by a microphone of one of client devices 114a-114n).

Document delivery module 112 may parse the request to extract the document analytics data contained within the request. Analytics data may be stored in database 130 for access by target identification module 120, or a similar storage/memory device, in association with other accumulated document analytics data. In some embodiments, target identification module 120 may receive/retrieve analytics data from document delivery module 112 and/or database 130. Targeted communications provider 102 records and processes the analytics data or analytic measures to generate one or more web analytics reports, including graphical displays, identification of targets for subsequent communication, and trend and prediction analysis, as described herein. For example, targeted communications provider 102 may filter the raw document analytics data received at document delivery module 112 to be used by target identification 120 in generating targets for subsequent communications, such as subsequent communication 134 targeted to client device 104a. Further, reports may be generated by targeted communications provider. Reports, for example, may include overviews and statistical analyses describing the relative frequency with which various site documents are being viewed, the rate of converting a document view to a purchase (e.g., conversion), an effectiveness of various targeted communications, and so forth, and identifying trends in and making predictions from the data as requested.

In some embodiments, client devices 104a-104n execute software applications, such as document viewer applications 114a-114n, for accessing and displaying one or more of documents 128a-128n. In response to a user command, such as actuating a pointer, document viewer applications 114a-114n may issue document requests 126a-126n to document delivery module 112 via network 108 (e.g., via the Internet). In response to requests 126a-126n, document delivery module 112 may transmit the documents 128a-128n to document viewer applications 114a-114n. Document viewer applications 114a-114n may interpret the received documents 128a-128n to display the requested documents 128a-128n at user interfaces (e.g., monitor) of client devices 104a-104n. Document delivery applications 114a-114n may generate additional requests 126a-126n for content from the document delivery module 112, or other remote network locations, as needed.

In some embodiments, client devices 104a-104n also transmit document viewing tracking information to targeted communications provider 102. For example, as described above, a document may include executable code (e.g., a document bug) to initiate requests 126a-126n from document delivery module 112. In some embodiments, requests 126a-126n may have analytics data contained/embedded therein, or otherwise associated therewith, such that transmitting requests 126a-126n cause transmission of analytics data from client devices 104a-104n to targeted communication provider 102. For example, as described above, requests 126a-126n may include image requests having an embedded string of data therein. Targeted communications provider may process (e.g., parse) requests 126a-126n to extract analytics data contained in, or associated with, requests 126a-126n.

In some embodiments, requests 126a-126n from client devices 104a-104n may be forwarded from document delivery module 112 to database 130 for storage and/or to target identification module 120 for processing. Target identification module 120 may process the received requests 126a-126n to extract document analytics data from requests 126a-126n. In some embodiments, document delivery module 112 may transmit analytics data and/or a corresponding analytics reports to target identification module.

System and Modules for One Embodiment of Targeted Message Delivery

Figure 2A:
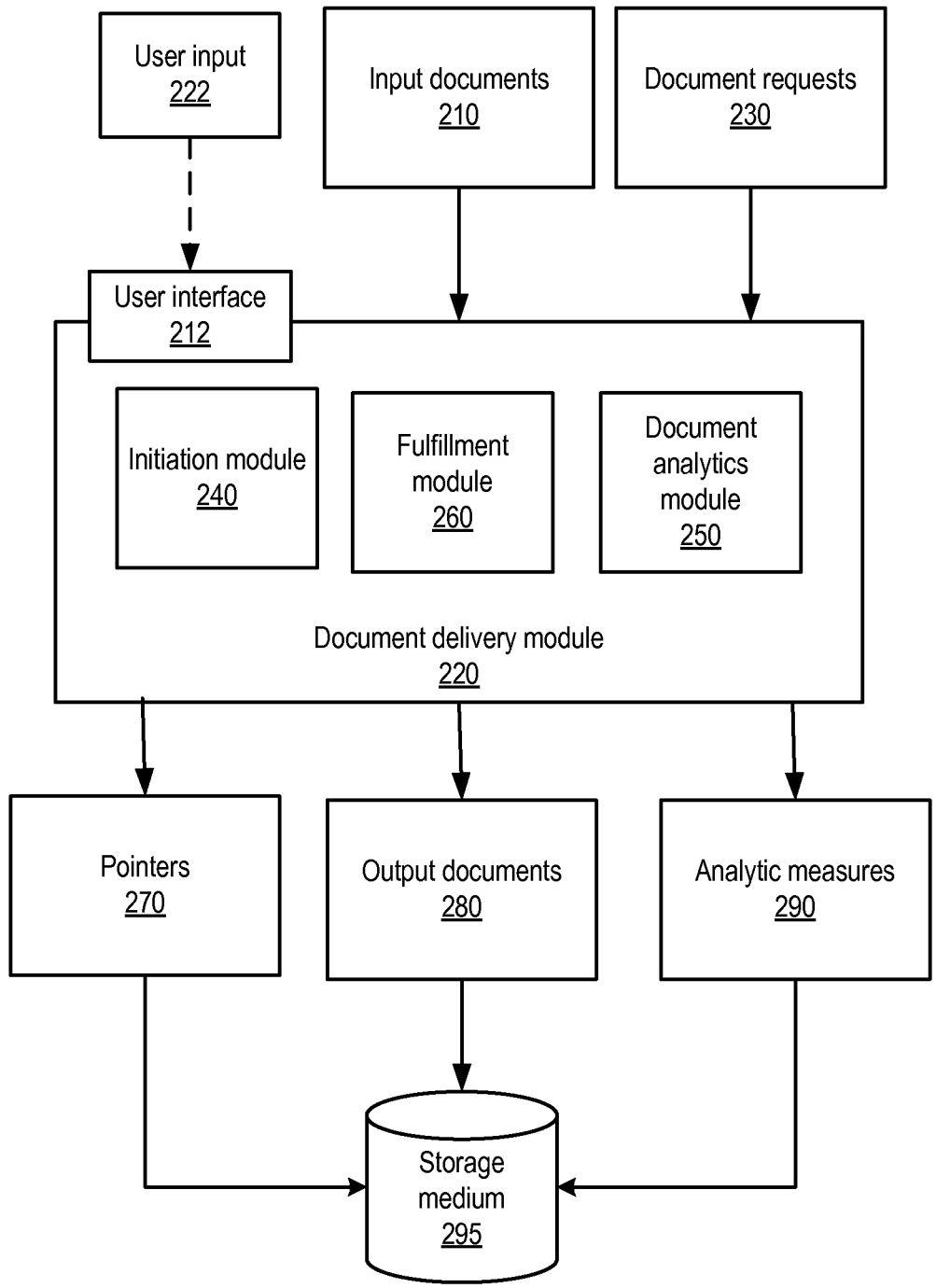
FIG. 2A illustrates a module that may be used in conjunction with targeted message delivery, according to some embodiments.

FIG. 2A illustrates a module that may be used in conjunction with targeted message delivery, according to some embodiments. Document delivery module 220 may perform document delivery functions related to targeted message delivery as discussed above with respect to FIG. 1 and further discussed below. Document delivery module 220 receives as input one or more input documents 210. Examples of input documents may include but are not limited to training videos, promotional videos, videos of familial events, smartphone applications, HTML pages containing links to external software installs, flash applications, personal computer software, podcasts, PDF documents, Microsoft Word™ documents, Microsoft Excel™ Documents, Microsoft Powerpoint™ documents, legal documents, catalogs, calendar events, newsletters, journals, commercial photographic images, amateur photographic images, large files used in the creation of graphical media, Adobe Photoshop™ suite PSD files, marketing materials, real estate listings and MP3s files.

Document delivery module 220 may receive user input 222 activating targeted communication system and configuring document delivery for intended document recipients. Document delivery module 220 then prepares input documents 210, according to user input 222 received via user interface 212, for use in targeted communication delivery. The user may select a variety of options for document delivery transactions though interaction with user interface 212. Document delivery module 220 generates as output one or more output documents 280. Output documents 280 may, for example, be stored to a storage medium 940, such as system memory, a disk drive, DVD, CD, etc.

In some embodiments, document delivery module 220 provides a user interface 212 via which a user may interact with document delivery module 220, for example to configure an input document for use in document delivery transactions, to select input documents for delivery to intended recipients, and to configure conditions for delivery or for subsequent targeting of communications involving output documents 280. In some embodiments, the user interface may provide user interface elements whereby the user may select options including, but not limited to, timing of delivery, follow-up, tracking options, and recording of analytic measures 290. Examples of analytic measures 290 include but are not limited to the metrics and analytics data discussed herein. Examples of analytic measures 290 further include measures of percentages of pointers that are actuated with respect to a particular document or group of documents, time from transmission of a pointer to actuation of the pointer, frequency with which a pointer is actuated (e.g., is a document downloaded using a particular pointer on more than one occasion), frequency of pointer forwarding in time or number of forwards with respect to a particular pointer (e.g., represented by multiple downloads from distinct IP or MAC addresses).

Document delivery module 220 may, for example, receive input documents 210 for use in document delivery transactions and user input 222 through a user interface for describing conditions under which documents are to be provided for intended recipients, as described above.

Document delivery module 220 may, for example, implement initiating a plurality of document delivery transactions with respect to a plurality of intended document recipients through operation of an initiation module 240 that can receive and process document delivery transaction requests and generate pointers 270 for transmission to intended document recipients. Pointers 270 are instructions or addressing values used to initiate, encourage, or complete a transaction involving delivery of a document to an intended recipient. Examples of pointers for requesting delivery include a uniform resource identifier (URI) associated with a contact record and providing a location of a document intended for delivery to the intended recipient. In some embodiments, pointers 270 are stored on a storage medium 295 prior to transmission to a recipient.

Document delivery module 220 may, for example, implement through a fulfillment module 260, in response to document requests 230 embodying actuations of respective ones of the plurality of pointers 270, delivering the one or more output documents 280 designated with respect to the respective document delivery transaction from a centralized document repository. In some embodiments, fulfillment module 260 may be used to solicit additional information from a user actuating a pointer, such as missing delivery addressing information, document preferences or content selections that include but are not limited to document selections, format selections, network addresses, security information, physical addresses, or other addressing information. In some embodiments, output documents 280 are stored on storage medium 295 prior to transmission to a recipient.

Figure 10:
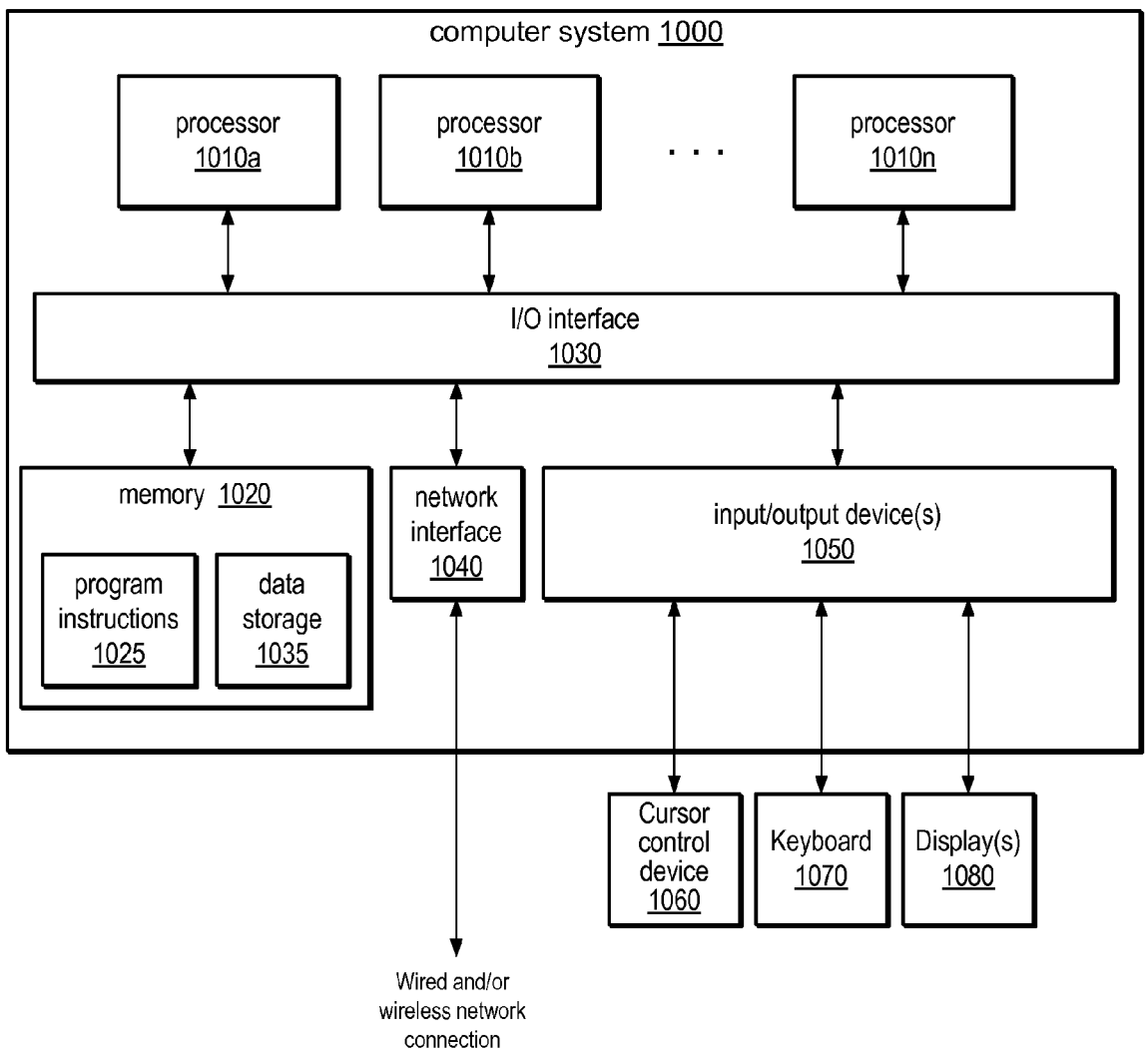
FIG. 10 illustrates an example computer system that may be used in embodiments.

Document delivery module 220 may, for example, implement recording analytic measures with respect to the delivering the one or more documents through a document analytics module 250 and may export analytic measures 290. In some embodiments, analytic measures 290 are stored on storage medium 295 prior to being provided to a target identification module. FIG. 10, discussed below, illustrates an example computer system on which embodiments of document delivery module 220 may be implemented.

Figure 2B:
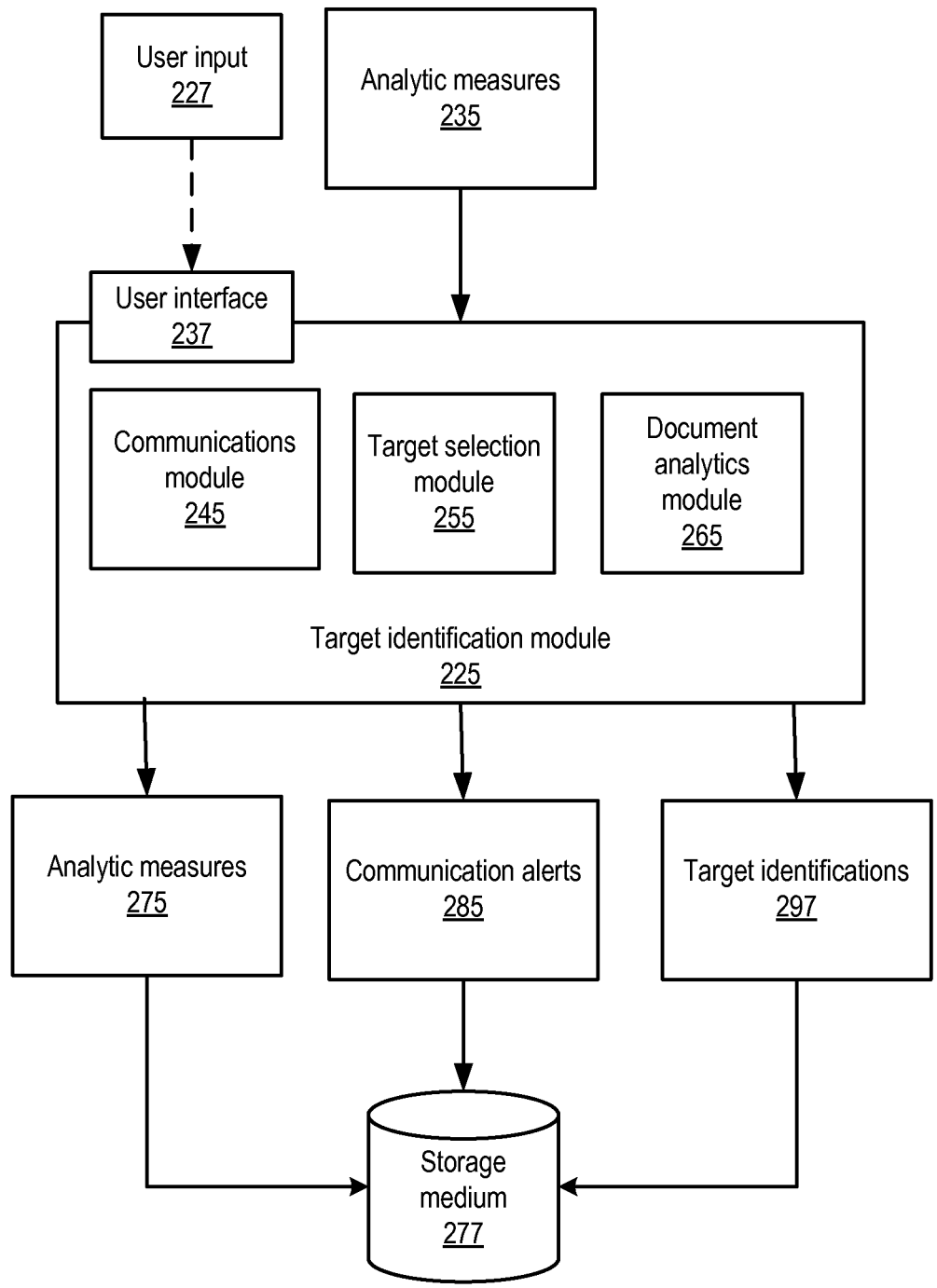
FIG. 2B depicts a module that may implement targeted message delivery, according to some embodiments.

FIG. 2B depicts a module that may implement targeted message delivery, according to some embodiments. Target identification module 225 may implement one or more of the targeted communication techniques and tools discussed herein. Target identification module 225 may, for example, implement one or more generating and recording analytic measures, ranking the plurality of intended document recipients with respect to the analytic measures and identifying a target for a subsequent communication based on the ranking. Additionally, in some embodiments, target identification module 225 may implement alerting a communication agent to an identity of the target for the subsequent communication. In some embodiments, target identification module 225 may perform initiating or transmitting the subsequent communication to the target for the subsequent communication. FIG. 10 illustrates an example computer system on which embodiments of target identification module 225 may be implemented.

Target identification module 225 receives as input one or more analytic measures 235. Examples of analytic measures 235 are discussed above with respect to FIG. 1 and FIG. 2A. In addition to the analytic measures 235 received by target identification module 225, a document analytics module 265 may generate additional analytic measures 275, comprising both data and reports for output. Examples of analytic measures 275 further include mining of data and metadata associated with particular document delivery transactions to identify communication agents or their users that are superior or inferior in their effectiveness at identifying intended recipients with superior delivery or conversion metrics and characteristics.

A target selection module 255 may implement ranking the plurality of intended document recipients with respect to the analytic measures and identifying a target for a subsequent communication, in embodiments using one or both of analytic measures 235 and analytic measures 275. A communications module 245 may perform alerting a communication agent to an identity of the target for the subsequent communication as well as initiating or transmitting the subsequent communication to the target for the subsequent communication.

Target identification module 225 may receive user input 227 activating or configuring a tool for targeted communications. Target identification module 225 then uses analytic measures 235, according to user input 227 received via user interface 237, to generate target identifications 297 and communication alerts 285. Target identifications 297 and communication alerts 285 may, for example, be stored to a storage medium 277, such as system memory, a disk drive, DVD, CD, etc.

In some embodiments, target identification module 225 may provide a user interface 237 via which a user may interact with the target identification module 225, for example to activate a targeted communications tool. In some embodiments, the user interface may provide user interface elements whereby the user may select options including, but not limited to, reporting preferences, communication preferences, and indications of input.

Operations Used in One Embodiment of Targeted Message Delivery

Figure 3A:
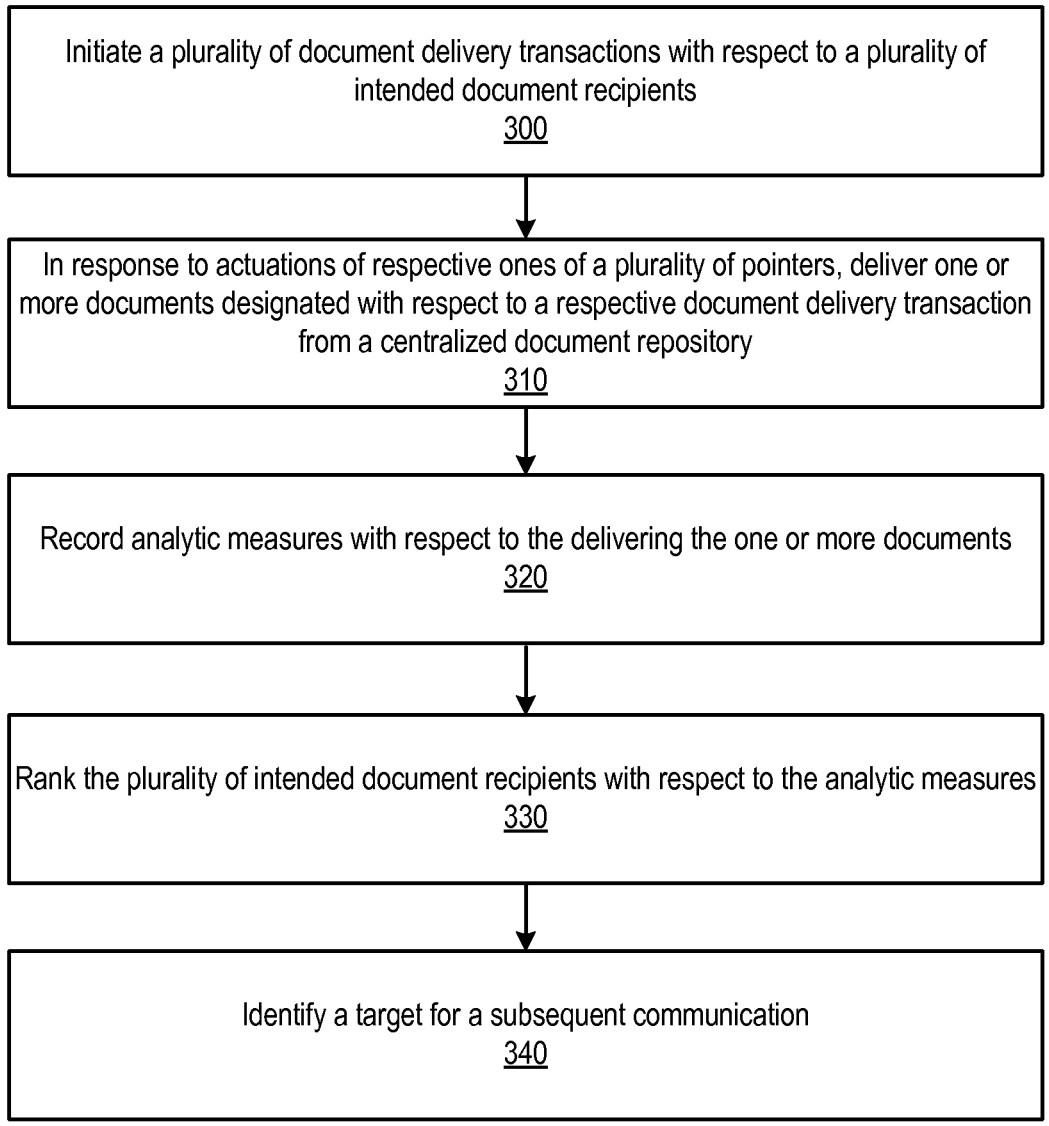
FIG. 3A illustrates a high-level logical flowchart of a process for targeted message delivery, according to one embodiment.

FIG. 3A illustrates a high-level logical flowchart of a process for targeted message delivery, according to one embodiment. A plurality of document delivery transactions is initiated with respect to a plurality of intended document recipients (block 300). In response to actuations of respective ones of a plurality of pointers, one or more documents designated with respect to the respective document delivery transaction is delivered from a centralized document repository (block 310). Analytic measures are recorded with respect to the delivering the one or more documents (block 320). The plurality of intended document recipients is ranked with respect to the analytic measures (block 330). A target for a subsequent communication is identified based on the ranking (block 340).

Figure 3B:
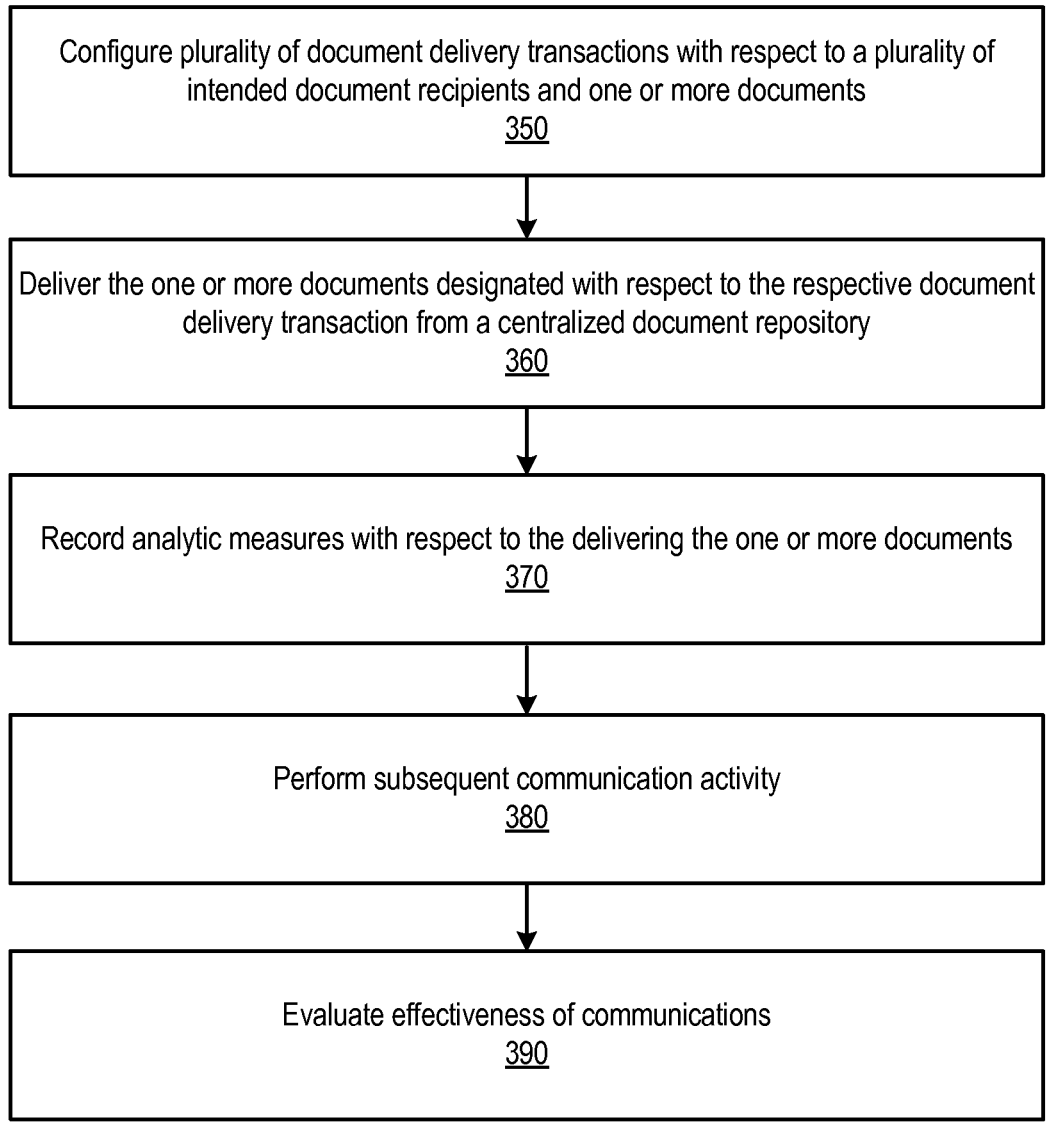
FIG. 3B depicts a high-level logical flowchart of a process for evaluating effectiveness of targeted message delivery, according to one embodiment.

FIG. 3B depicts a high-level logical flowchart of a process for evaluating effectiveness of targeted message delivery, according to one embodiment. A plurality of document delivery transactions is configured with respect to a plurality of intended document recipients and one or more documents (block 350). The one or more documents designated with respect to the respective document delivery transaction are delivered from a centralized document repository (block 360). Analytic measures are recorded with respect to the delivering the one or more documents (block 370). Subsequent targeted communication activity is performed (block 380). Effectiveness of the communications is evaluated (block 390).

Figure 4:
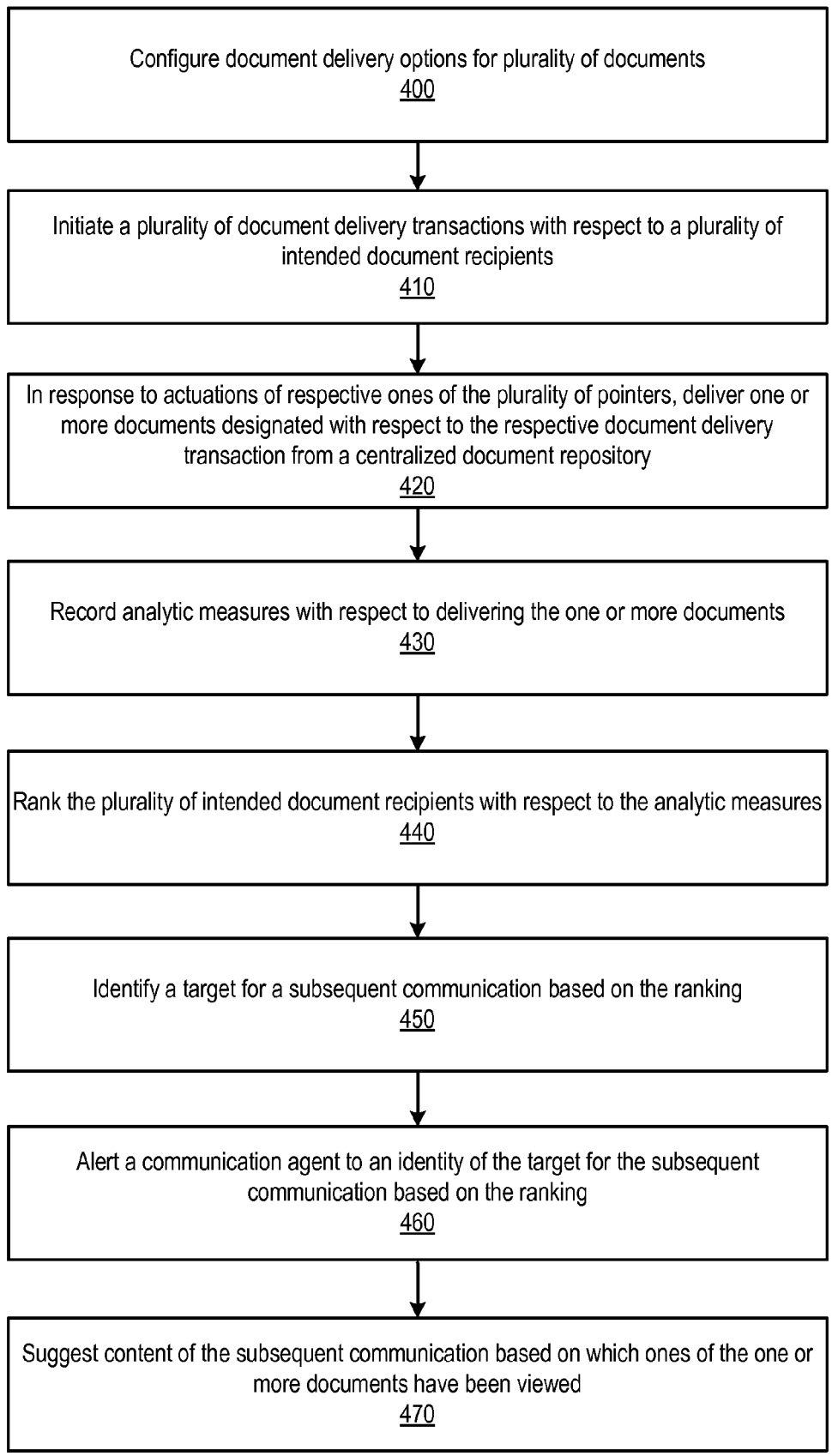
FIG. 4 illustrates a high-level logical flowchart of a process for targeted message delivery, according to one embodiment.

FIG. 4 illustrates a high-level logical flowchart of a process for targeted message delivery, according to one embodiment. Document delivery options are configured for a plurality of documents (block 400). A plurality of document delivery transactions is initiated with respect to a plurality of intended document recipients (block 410). In response to actuations of respective ones of the plurality of pointers, one or more documents designated with respect to a respective document delivery transaction is delivered from a centralized document repository (block 420). Analytic measures are recorded with respect to the delivering the one or more documents (block 430). The plurality of intended document recipients are ranked with respect to the analytic measures (block 440). A target for a subsequent communication is identified based on the ranking (block 450). A communication agent is alerted to an identity of the target for the subsequent communication based on the ranking (block 460). Content of the subsequent communication is suggested based on which ones of the one or more documents have been viewed (block 470).

Figure 5A:
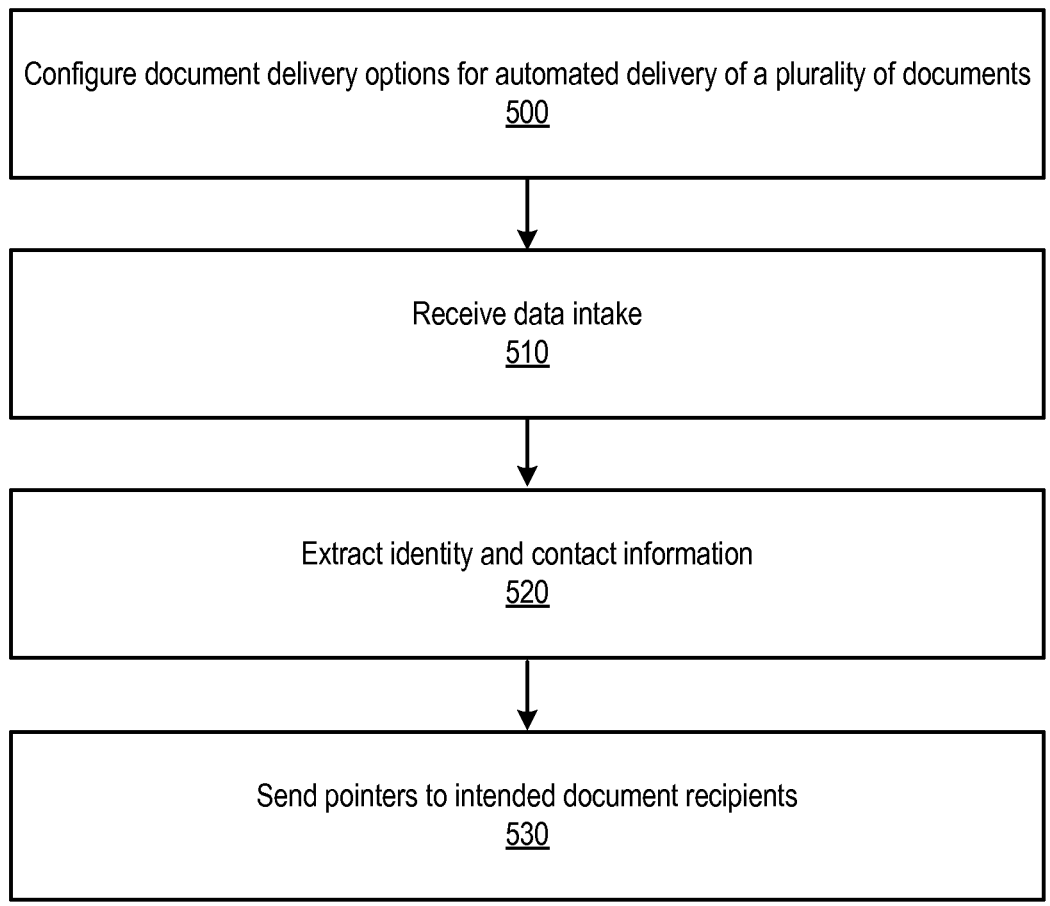
FIG. 5A depicts a high-level logical flowchart of a process for message delivery automation, according to one embodiment.

FIG. 5A depicts a high-level logical flowchart of a process for message delivery automation, according to one embodiment. Document delivery options for automated delivery of a plurality of documents are configured (block 500). Data intake is received (block 510). Identity information and contact information are extracted (block 520). Pointers are sent to intended document recipients (block 530).

Figure 5B:
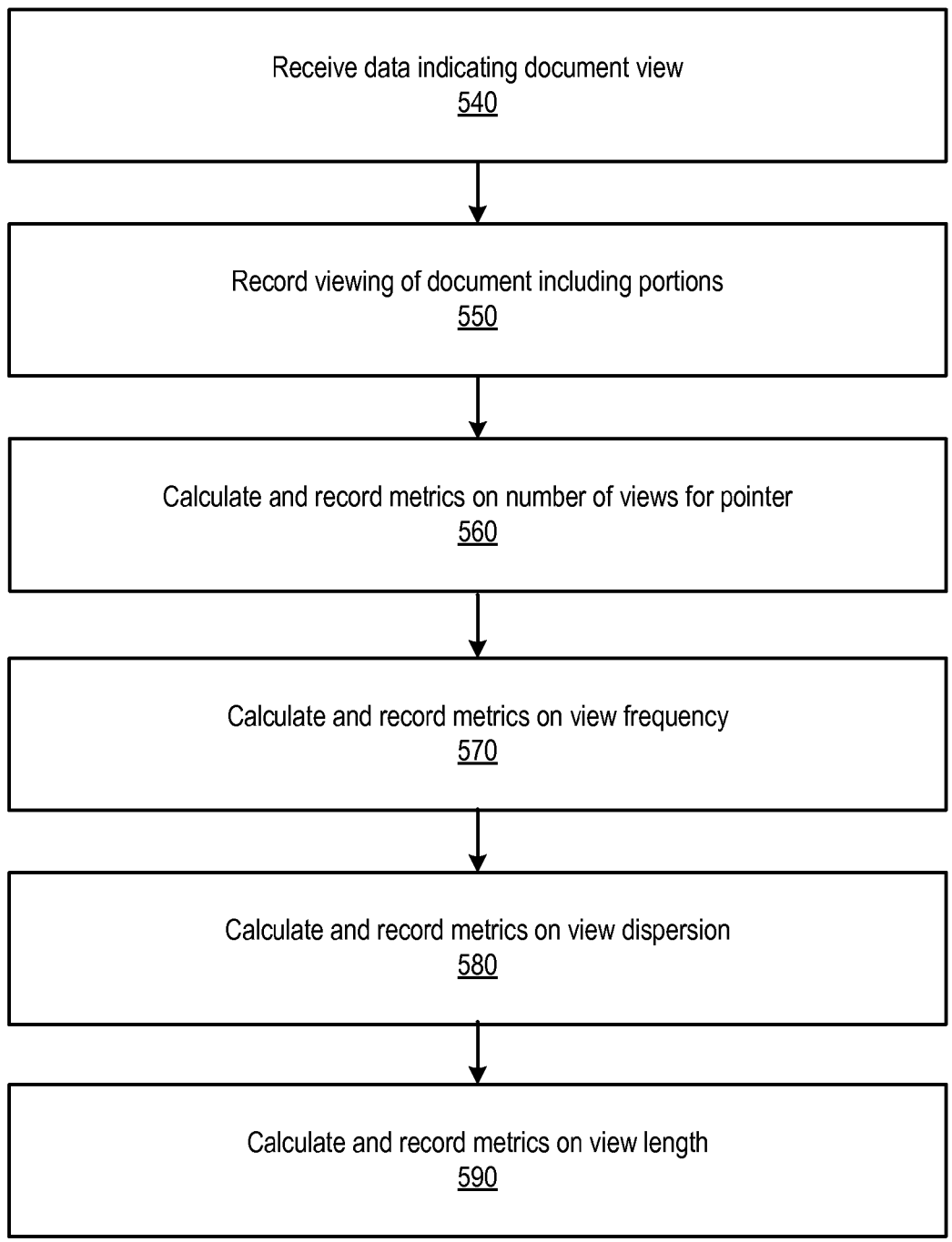
FIG. 5B illustrates a high-level logical flowchart of a process for generating metrics for use in targeted message delivery, according to one embodiment.

FIG. 5B illustrates a high-level logical flowchart of a process for generating metrics for use in targeted message delivery, according to one embodiment. Data indicating a document view is received (block 540). Viewing of the document, including portions viewed, is recorded (block 550). Metrics are calculated and recorded on the number of views for the respective pointer (block 560). View frequency metrics are calculated and recorded (block 570). View dispersion metrics are calculated and recorded (block 580). View length metrics are calculated and recorded (block 590). As used herein, the term metrics and the term analytic measures are interchangeable.

Additional System for One Embodiment of Targeted Message Delivery

Figure 6:
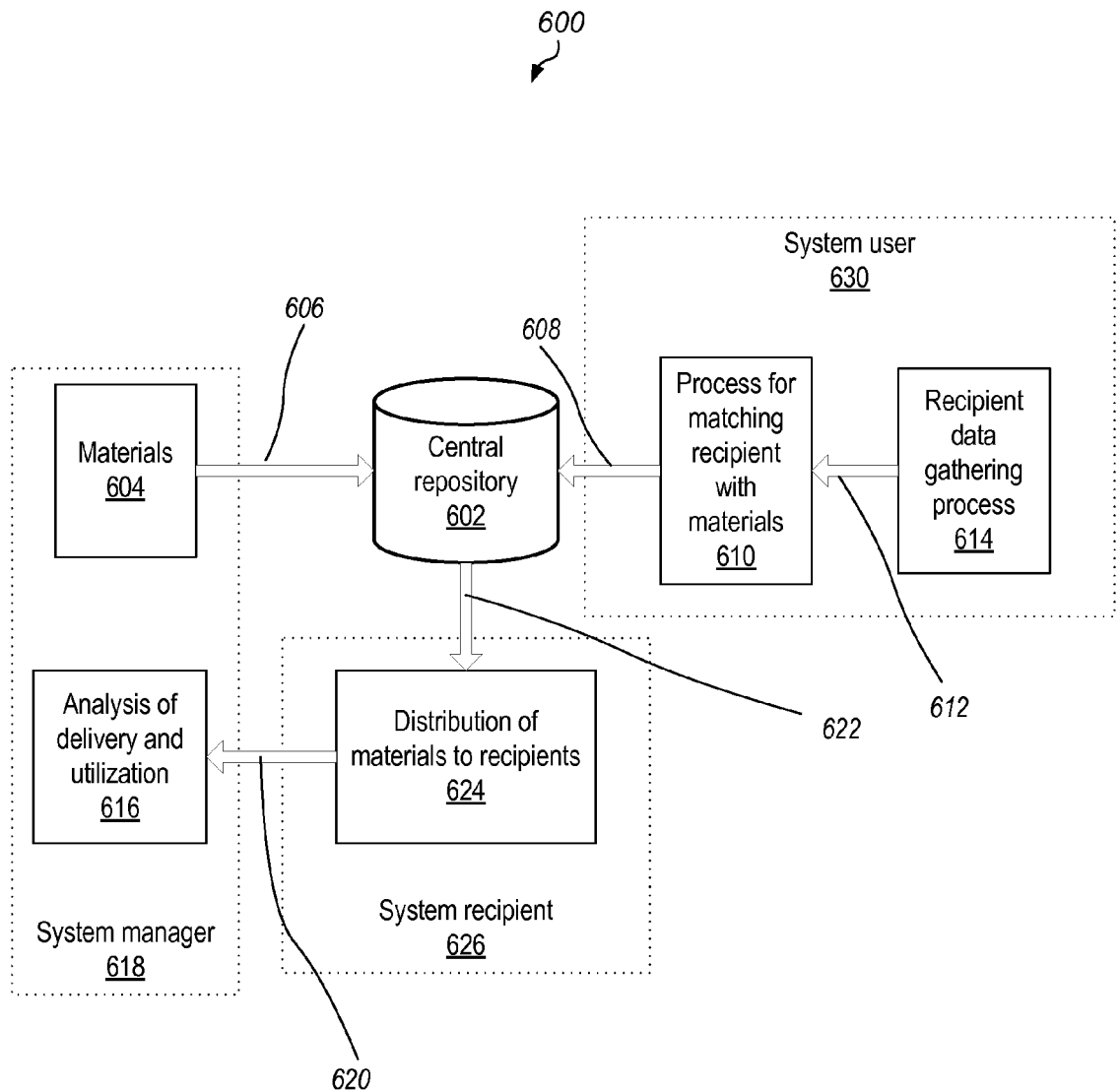
FIG. 6 depicts a system for targeted message delivery, according to one embodiment.

FIG. 6 depicts a system for targeted message delivery, according to one embodiment. A targeted message delivery system 600 contains a central repository 602. Within targeted message delivery system 600, three primary roles are performed. A sending user is a member of a particular group that can view a materials catalog for central repository 602. A materials manager controls the materials catalog for central repository 602, or content in system 600, for their particular account and also manages the sending user accounts. A recipient is an individual, or group of individuals, that receives materials sent by a sending user of the system 600. A role can be embodied by one or more individuals, and an individual can fulfill one or more roles.

Materials 604 may include any sort of document, as described above, or deliverable content, digital or physical, that the user may wish to share. In some embodiments, materials can fall into one of four categories, digital, physical, digital converted to physical and physical converted to digital. Digital deliverables among materials 604 can include but are not limited to training videos, promotional videos, videos of familial events, smartphone applications, HTML pages containing links to external software installs, flash applications, personal computer software, podcasts, PDF documents, Microsoft Word™ documents, Microsoft Excel™ documents, Microsoft Powerpoint™ documents, legal documents, catalogs, calendar events, newsletters, journals, commercial photographic images, amateur photographic images, large files used in the creation of graphical media, Adobe Photoshop™ suite PSD files, marketing materials, real estate listings and MP3s files.

Physical deliverables among materials 604 can include but are not limited to DVDs of promotional videos, DVDs of training videos, DVDs of familial events, glossy brochures, legal documents, catalogs, calendars, newsletters, journals, periodicals, professional images or photos, real estate listings, gifts, merchandise, marketing materials, consumables, and brand loyalty merchandise with or without company logos. Among materials 604, digital materials converted to physical materials are those items originating as digital content but delivered in a physical format. Examples of digital to physical transformation include but are not limited to training videos written to DVD, promotional videos written to DVD, PDF documents printed on glossy or other types of paper or material, company logos printed on promotional materials, legal documents, catalogs, calendars, newsletters, journals, images, real estate listings and marketing materials printed to glossy stock. In some embodiments, central repository 602 may be structured as a database such as database 130, discussed above with respect to FIG. 1.

Physical materials converted to digital form are those items from the user and sent to our system or a third party and converted into a digital format for network delivery. Examples of physical to digital content include but are not limited to brochures, images, notes, catalogs, CDs of audio recordings, DVDs of videos for promotional or training purposes, real estate printings, or legal documents including actual signatures. Some embodiments are agnostic as to the input.

Document input process 606 represents a process by which materials 604 are added to the central repository 602 and is analogous to the input of input documents 210 described above with respect to FIG. 2A. Central repository 602 is, in one embodiment, a centralized server, or infrastructure consisting of distributed or geographically diverse servers, enabling operations for managing and sharing the user's content, which may be analogous to those operations described above with respect to targeted communications provider 102 of FIG. 1.

In one embodiment, an application consisting of either a custom local computer application or portal application enables the user to quickly add and manage materials to the central repository. In some embodiments, document delivery module 220 of FIG. 2A embodies the application and performs such functions. In some embodiments, the application is also used to manage and inventory physical versions of digital files (such as DVDs, CDs and paper documents) and digital versions of physical files (via scanning and digital conversion). The application also allows access to the analytics information, discussed above with respect to FIG. 2A as analytic measures 290, that enables the system user to determine which documents have been accessed by end users.

Network communication 608 is communication between a client application, such as a document delivery module 112 of FIG. 1, and central repository 602, such as database 130 of FIG. 1. A process for matching recipients with materials 610 includes the process by which the proper documents are matched with the proper recipients. Components of such a process include, in some embodiments, in response to actuations of respective ones of a plurality of pointers and delivering the one or more documents designated with respect to the respective document delivery transaction from a central repository 602. Data intake 612 indicates the flow of information to process for matching recipients with materials 610. Recipient data gathering process 614 includes the recipient gathering and selection process, which, in some embodiments, includes initiating a plurality of document delivery transactions with respect to a plurality of intended document recipients. In some embodiments, the initiating includes sending to each of the plurality of intended document recipients a respective one of a plurality of pointers for requesting delivery of one or more documents designated with respect to a respective document delivery transaction.

System manager 618 includes an analysis segment of targeted message delivery system 600. Analysis of delivery and utilization 616, in some embodiments, provides analytics information such as but not limited to the delivery status of content, the viewing of content by the recipients, amount of time the application was used by all parties, number of unique viewers of specific content originating from any given transaction, and a geographic representation of consumers of content. In some embodiments, analysis of delivery and utilization 616 includes recording analytic measures with respect to the delivering the one or more documents. In some embodiments, the analytic measures comprises a measure of actuations of each of the plurality of pointers, which is received as part of a logging operation 620 for logging a transaction into the analytics component via network traffic. In some embodiments, analysis of delivery and utilization 616 includes ranking the plurality of intended document recipients with respect to the analytic measures and identifying a target for a subsequent communication based on the ranking.

Delivery component 622 represents the notification process to the recipient. In some embodiments, such a notification process includes sending to each of the plurality of intended document recipients a respective one of a plurality of pointers for requesting delivery of one or more documents designated with respect to a respective document delivery transaction. Delivery component 622 can occur via digital or tangible methods such as but not limited to email, direct postal mail, FedEx™, UPS™ shipment, social network notifications, Facebook™ message, Twitter™ post, LinkedIn™ message, and cell phone text message. In some embodiments of digital methods, a unique hash or pointer representing the entire transaction from sender to matching is generated and conveyed to the recipient. This has or pointer is identified with a respective one of the plurality of intended document recipients. This conveyance can done by methods such as but not limited to a URL, QR code, bar code, RFID chip for presentation, saved to a USB portable thumb drive, or via a website and unique code for presentation to that website.

Figure 7:
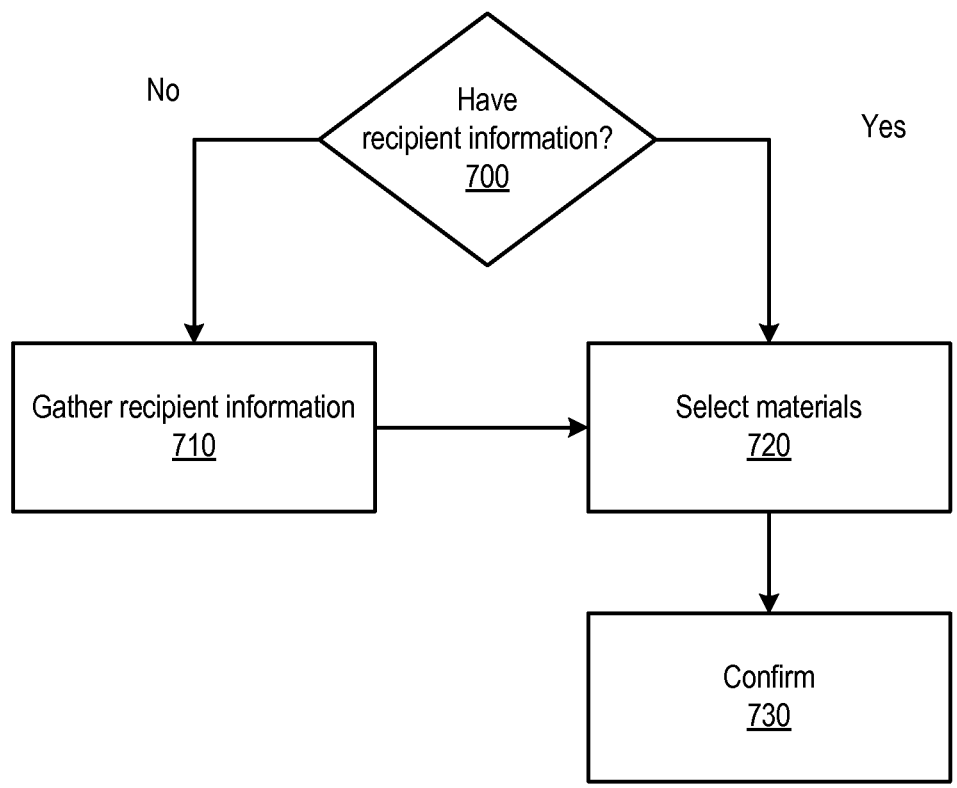
FIG. 7 illustrates a high-level logical flowchart of a process for user interaction supporting targeted message delivery, according to one embodiment.

Distribution of materials to recipients 624 is the delivery of actual materials. This can be done in numerous ways including but not limited to email, social media, postal service, 3rd party service via an application programming interface, download within a browser, UPS™, FedEx™, DHL™, social media posting, Facebook™ posting, and Twitter™ direct message. In some embodiments, distribution of materials to recipients 624 further includes alerting a communication agent to an identity of the target for the subsequent communication based on the ranking or initiating the subsequent communication to the target for the subsequent communication based on the ranking Additional Operations Used in One Embodiment of Targeted Message Delivery FIG. 7 illustrates a high-level logical flowchart of a process for user interaction supporting targeted message delivery, according to one embodiment. In some embodiments, the operations performed in FIG. 7 may form part of a user interface, as discussed above with respect to user interface 212 of FIG. 2A or by a communication agent, such as communication agents 104a-104n of FIG. 1.

A determination is made as to whether to interact with an existing recipient in the system or to interact with a new recipient (block 700). An acquisition process is executed, whereby sending user gathers the recipients contact information (block 710). Examples of acquisition include but are not limited to scanning a business card using our iPhone™ or Android™ application, a desktop computer application that can use optical character recognition (OCR) on an image captured via a webcam or other image of a business card or other identification, submitting a picture of the business card to a website for processing, contact information conveyed via the Bump iPhone™ application or a smartphone application utilizing the Bump™ API, contact information conveyed by Bluetooth™ between devices, contact information conveyed by infrared between devices, contact information conveyed through a Personal Area Network, manually entering the contact's information into a smartphone or a website, scanning a QR code on an identification card and acquiring the contact details via social networks such as but not limited to Facebook™, LinkedIn™ or Twitter™.

A materials selection process is performed, by which a user chooses which material or materials will be conveyed to the recipient (block 720). A confirmation process is performed, displaying the recipient or recipients and the material, or materials, to be conveyed to the intended recipients (block 730).

Figure 8:
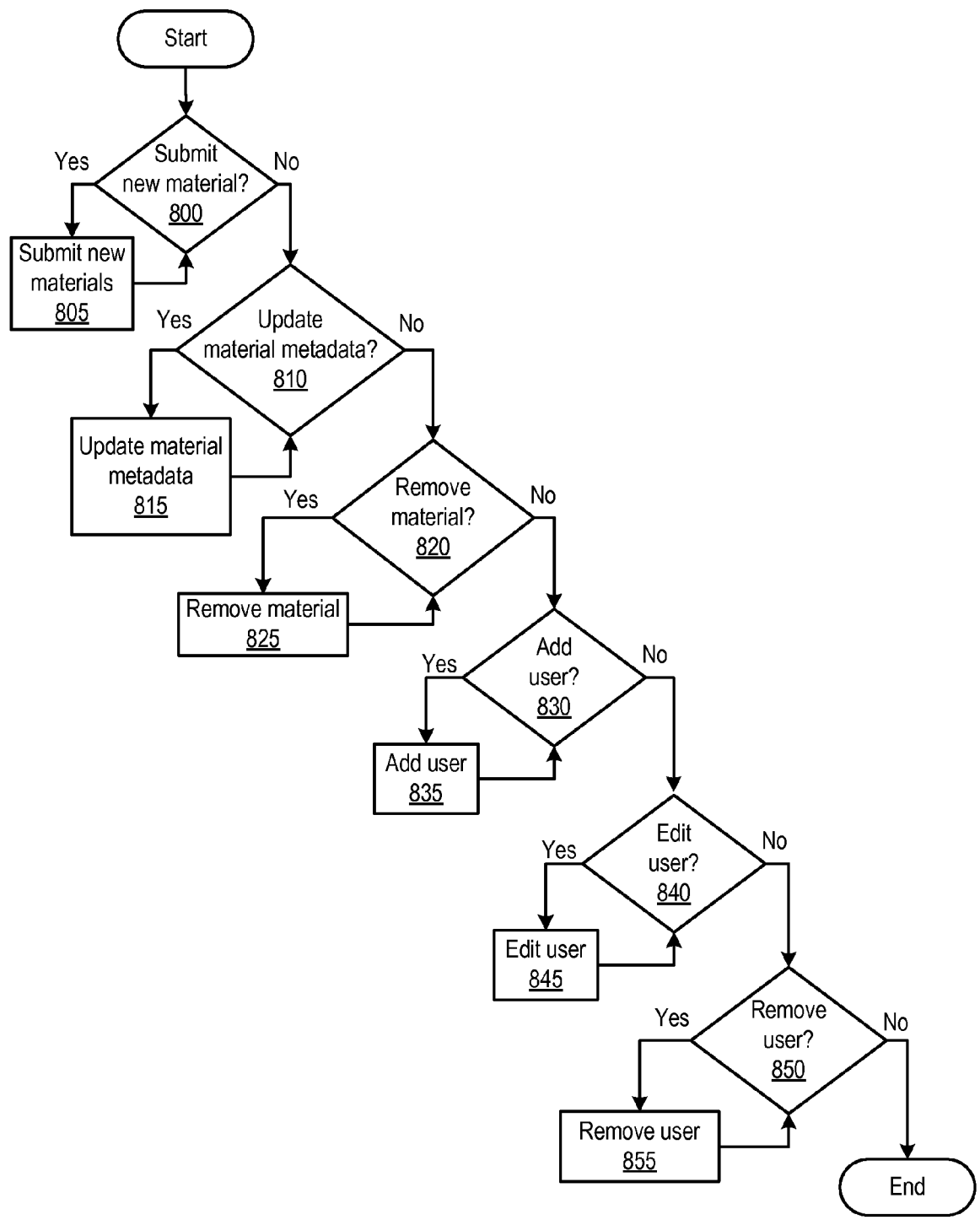
FIG. 8 illustrates a high-level logical flowchart of a process for user interaction supporting management of targeted message delivery, according to one embodiment.

FIG. 8 depicts a high-level logical flowchart of a process for user interaction supporting management of targeted message delivery, according to one embodiment. In some embodiments, the operations performed in FIG. 8 may form part of a document delivery module, such as document delivery module 220 of FIG. 2A. The components representing decisions (e.g., block 810, block 820, block 830, block 840, block 850) are not tied to their particular order of operation and users may decide to interact with the invention in a non-linear fashion and the decision nodes can be directly accessed without following the order specified in this process.

A determination is made as to whether to submit new material (block 800). If new materials submission is indicated, a new materials submission process is executed (block 805). In some embodiments, the new materials submission process encompasses the usage of a user interface, such as user interface 212 of FIG. 2A, to catalog the new material, whether digital or physical. The process allows for but is not limited to a manager to upload new content via the application, described above with respect to FIG. 6, and that content to be cataloged in the central repository, for electronic materials to be emailed to a specific email address for a particular manager and the content to be automatically added to their catalog of available materials, the physical material could be conveyed by means such as but not limited USPS, UPS, FedEx, and DHL and then converted to electronic format or merely added to the catalog for physical distribution.

A determination is made as to whether to update existing material metadata (block 810). If materials metadata update is indicated, a materials metadata process is invoked (block 815). Examples of updating the metadata, or information about the materials, include but are not limited to emailing a new version of an electronic document and the system performing heuristics on the attached document title of the subject of the email having the title of the document to update, the manager editing the content via a web based application, the manager utilizing a custom developed software application on his or her local computer, or the user faxing in a printed form containing changes to the requested information about the material.

A determination is made as to whether to remove materials from the system (block 820). If materials removal is indicated, a materials removal process is invoked (block 825). The methods of removal include but are not limited to choosing to remove the material via a web based portal, via the Apple iPad™ based administrative tool, via the email interface through the unique email address for each manager, via faxing changes to an automated system, or through mailing in physical forms completed by the manager.

A determination is made as to whether to add a new user to the system (block 830). If user addition is indicated, a user addition process is invoked (block 835). The process of adding a sending user can be accomplished through such means as but not limited to using the web based portal, using the iPhone™ or iPad™ application, using a smartphone application, mailing in a request, faxing a request, or by calling an automated phone system with the necessary information concerning the sending user.

A determination is made as to whether to edit a user of the system (block 840). If user editing is indicated, a user editing process is invoked (block 845). Examples of editing a user include but are not limited to using the web portal, using the iPhone™ or iPad™ application, using a smartphone application, calling an automated phone system, sending an email to the manager's unique account, via an automated phone system, or by faxing in instructions concerning the user.

A determination is made as to whether to remove a user from the system (block 850). If user removal is indicated, a user removal process is invoked (block 855). The process can be achieved in multiple ways, including but not limited to, utilizing the web portal, the iPhone™ or iPad™ application, the Android™ application, a smartphone application, mailing in the instructions, using an automated phone system, or faxing the necessary instructions.

Figure 9A:
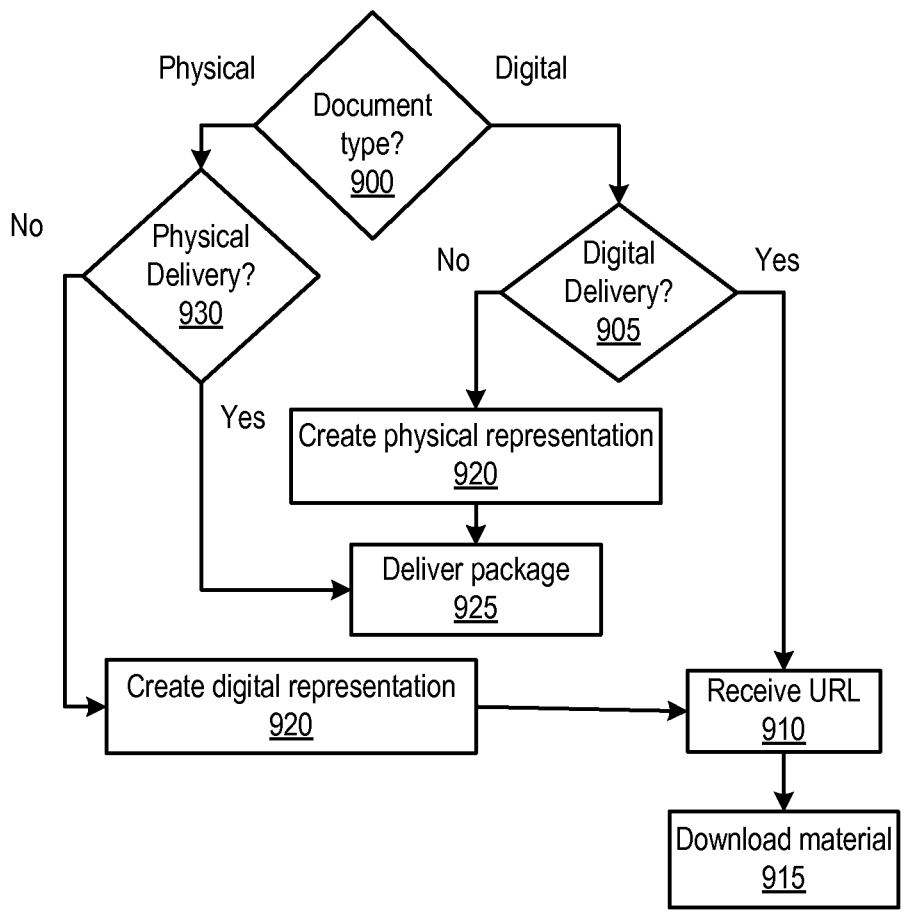
FIG. 9A depicts a high-level logical flowchart of a process for targeted message delivery, according to one embodiment.

FIG. 9A illustrates a high-level logical flowchart of a process for targeted message delivery, according to one embodiment. In one embodiment, a determination is made as to whether documents stored in a physical or digital medium are selected for delivery (block 900). If digital documents are selected for delivery, a determination is made as to whether physical or digital delivery is needed (block 905). A URL is provided to an intended recipient, who receives the URL (block 910). In some embodiments, the intended document recipient receives a uniquely encoded URL representing the digital materials for delivery. The delivery of this URL includes methods such as but not limited to email, iOS™ push notification, Facebook™ posting, LinkedIn™ private messaging, Twitter™ posting, delivery of a QR encoded image embedded in a web page, a file created on a USB memory stick, a URL printed and sent via USPS, FedEx, UPS, or DHL. Material is downloaded (block 915), representing the retrieval of the materials by the recipient by accessing the unique URL delivered in block 910.

Returning to block 905, if physical delivery of a digital document is selected, a physical representation of the digital document is created (block 920). Examples of this process include but are not limited to print on demand services, interfacing with FedEx Web Services for Office and Print™, remote printing via Google's Print Cloud™, or remote printing via HP's ePrint™. A package including the physical representation is delivered (block 925). This delivery can occur in ways such as but not limited to courier delivery to a physical location, such as identified by an address or GPS coordinates, USPS™ delivery, UPS™ delivery, FedEx™ delivery, pickup from an intermediary third party, pickup from a print house such as but not limited to FedEx™ office or UPS™ store, or printed by a third party then delivered or by courier delivery. In some embodiments, a logging transaction will be created and archived by the system for analytics purposes.

Returning to block 900, if a physical document is selected for delivery, a determination is made as to whether physical delivery is indicated (block 930). If a physical document is selected for physical delivery, the process proceeds to block 925, which is described above. If a physical document is selected for digital delivery, a digital representation is created (block 920) through a process of converting physical materials to digital content for network delivery. Examples of this process include but are not limited to Optical Mark Recognition, utilizing Optical Character Recognition, scanning of documents, scanning of images, digital photography and 3D scanning of physical artifacts. The process then proceeds to block 910, which is described above.

Figure 9B:
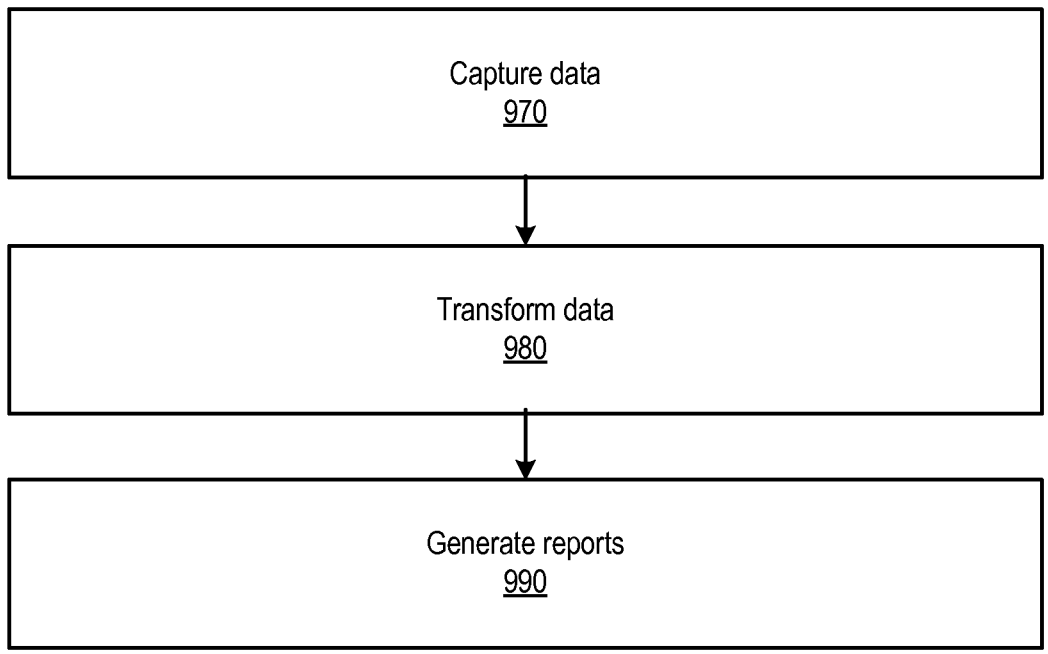
FIG. 9B depicts a high-level logical flowchart of a process for reporting on targeted message delivery, according to one embodiment.

FIG. 9B depicts a high-level logical flowchart of a process for reporting on targeted message delivery, according to one embodiment. Data is captured (block 970), which may include but is not limited to capturing data on sending user interactions, capturing data associated with manager interactions, capturing data associated with recipient interactions, capturing data on delivery instantiations from sending user to recipient, views and repeat views of a unique URL by a recipient, standard web traffic for the public, administrative and recipient portions of the system website, and any delivery confirmations from third party delivery mechanisms used during the conveyance of materials from system to recipient.

Data is transformed into a reportable format (block 980). Transformations include but are not limited to statistical analysis on frequency of events, calculation of most active materials and users for a specific account, and of delivery reporting.

Reports are generated (block 990). Examples of report generation include but are not limited to live reporting available via the web portal, reports downloadable from the portal through the invention or the portal in PDF format, charts and graphs of data viewable in the iPhone™ or iPad™ application, reports generated within a smartphone application or physical reports created and mailed via means such as but not limited to UPS, USPS, FedEx or DHL.

Example System

Embodiments of a document delivery module and a targeted identification module and of the targeted communications techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a document delivery module and a targeted identification module and of the targeted communications techniques are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a document delivery module and a targeted identification module and of the targeted communications techniques as described herein, and data storage 1035, comprising various data accessible by program instructions 1025. In one embodiment, program instructions 1025 may include software elements of embodiments of a document delivery module and a targeted identification module and of the targeted communications techniques as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a document delivery module and a targeted identification module and of the targeted communications techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, the method comprising:
    performing, using one or more processors,
        initiating a plurality of document delivery transactions with respect to a plurality of intended document recipients, wherein
            the initiating comprises sending to each of the plurality of intended document recipients a respective one of a plurality of unique URLs for requesting delivery of one or more documents designated with respect to a respective document delivery transaction, and
            each of the plurality of URLs is uniquely identified with a respective one of the plurality of intended document recipients, such that, for a particular intended document recipient, a respective one of the plurality of unique URLs sent to the particular intended document recipient is distinguishable from a respective one of the plurality of unique URLs sent to any other intended document recipient;
        in response to actuations of respective ones of the plurality of unique URLs, delivering the one or more documents designated with respect to the respective document delivery transaction from a centralized document repository;
        recording analytic measures with respect to the delivering the one or more documents, wherein
            the analytic measures comprise a measure of actuations of each of the plurality of URLs, and
            the recording analytic measures comprises
                recording information with respect to respective delivery confirmations of the plurality of documents subsequent to actuations of the plurality of URLs,
                identifying a plurality of transaction conversions as resulting from actuations of respective ones of the plurality of URLs,
                calculating respective conversion efficiencies as ratios of the transaction conversions to actuations of respective ones of the plurality of URLs, and
                ranking the one or more documents with respect to respective conversion efficiencies;
        identifying a target for a subsequent communication based on the ranking.

2. The computer-implemented method of claim 1, further comprising alerting a communication agent to an identity of the target for the subsequent communication.

3. The computer-implemented method of claim 1, further comprising initiating the subsequent communication to the target for the subsequent communication.

4. The computer-implemented method of claim 1, further comprising
identifying a plurality of transaction conversions as result of respective ones of the plurality of URLs, and
ranking the one or more documents with respect to respective conversion efficiency.

5. The computer-implemented method of claim 1, further comprising
identifying a plurality of transaction conversions as result of respective ones of the plurality of URLs, and
ranking one or more communication agents with respect to a conversion efficiency.

6. A system, comprising:
at least one processor; and
a memory comprising program instructions, wherein the program instructions are executable by the at least one processor to:
  initiate a plurality of document delivery transactions with respect to a plurality of intended document recipients, wherein
    the program instructions executable to initiate plurality of document delivery transactions comprises program instructions executable to send to each of the plurality of intended document recipients a respective one of a plurality of unique URLs for requesting delivery of one or more documents designated with respect to a respective document delivery transaction, and
    each of the plurality of URLs is uniquely identified with a respective one of the plurality of intended document recipients in a contact record data store, such that, for a particular intended document recipient, a respective one of the plurality of unique URLs sent to the particular intended document recipient is distinguishable from a respective one of the plurality of unique URLs sent to any other intended document recipient;
  in response to actuations of respective ones of the plurality of URLs, deliver the one or more documents designated with respect to the respective document delivery transaction from a centralized document repository;
  record analytic measures with respect to the delivering the one or more documents, wherein
    the program instructions executable to record the analytic measures comprise program instructions executable to record an identity associated with each actuation, and
    the program instructions executable to record analytic measures comprise
      program instructions executable to identify a plurality of transaction conversions as resulting from actuations of respective ones of the plurality of URLs, and
      program instructions executable to calculate respective conversion efficiencies as ratios of the transaction conversions to actuations of respective ones of the plurality of URLs,
      program instructions executable to record portions of the one or more documents that were viewed by a particular user, and
      program instructions executable to rank the one or more documents with respect to respective conversion efficiencies;
  identify a target for a subsequent communication based on the analytic measures; and
  suggest content of the subsequent communication based on the portions of the one or more documents that were viewed by the particular user.

7. The system of claim 6, wherein
the program instructions executable to record analytic measures with respect to the delivering the one or more documents further comprise instructions executable to record lengths of time recorded with respect to the actuations, and
the program instructions executable to identify the target for the subsequent communication based on the analytic measures comprise instructions executable to identify the target for the subsequent communication based on the lengths of time.

8. The system of claim 6, wherein
the program instructions executable to record analytic measures with respect to the delivering the one or more documents further comprise instructions executable to record numbers of distinct computing devices performing the actuations with respect to each of the plurality of URLs, and
the program instructions executable to identify the target for the subsequent communication based on the analytic measures comprise instructions executable to identify the target for the subsequent communication based on the numbers of distinct computing devices performing the actuations with respect to each of the plurality of URLs.

9. The system of claim 6, wherein
the program instructions executable to record analytic measures with respect to the delivering the one or more documents further comprise instructions executable to record analytic measures with respect to rates at which respective ones of the plurality of URLs for requesting delivery of one or more documents are transmitted by recipients of the plurality of URLs for requesting delivery of one or more documents, and
the program instructions executable to identify the target for the subsequent communication based on the analytic measures comprise instructions executable to identify the target for the subsequent communication based on the rates.

10. The system of claim 6, wherein
the program instructions further comprise program instructions executable to rank the one or more documents with respect to a delivery efficiency based on the analytic measures with respect to the delivering the one or more documents.

11. The system of claim 6, wherein
the program instructions further comprise program instructions executable to rank the plurality of document delivery transactions with respect to a delivery efficiency based on the analytic measures with respect to the delivering the one or more documents.

12. The system of claim 6, wherein
the program instructions further comprise program instructions executable to rank one or more communication agents with respect to a delivery efficiency based on the analytic measures with respect to the delivering the one or more documents.

13. A non-transient computer-readable storage medium storing program instructions, wherein the program instructions are computer-executable to implement:
  initiating a plurality of document delivery transactions with respect to a plurality of intended document recipients, wherein the initiating comprises sending to each of the plurality of intended document recipients a respective one of a plurality of unique URLs for requesting delivery of one or more documents designated with respect to a respective document delivery transaction, and each of the plurality of URLs is uniquely identified with a respective one of the plurality of intended document recipients, such that, for a particular intended document recipient, a respective one of the plurality of unique URLs sent to the particular intended document recipient is distinguishable from a respective one of the plurality of unique URLs sent to any other intended document recipient;

in response to actuations of respective ones of the plurality of unique URLs, delivering the one or more documents designated with respect to the respective document delivery transaction from a centralized document repository;

recording analytic measures with respect to the delivering the one or more documents, wherein the analytic measures comprise a measure of actuations of each of the plurality of URLs, and the recording analytic measures comprises recording information with respect to respective delivery confirmations of the plurality of documents subsequent to actuations of the plurality of URLs, identifying a plurality of transaction conversions as resulting from actuations of respective ones of the plurality of URLs, calculating respective conversion efficiencies as ratios of the transaction conversions to actuations of respective ones of the plurality of URLs, and ranking the one or more documents with respect to respective conversion efficiencies;

identifying a target for a subsequent communication based on the ranking.

14. The non-transient computer-readable storage medium of claim 13, wherein the program instructions further comprise instructions computer-executable to implement, identifying parties requesting respective ones of the plurality of document delivery transactions; and ranking the parties with respect to a delivery efficiency of the respective ones of the plurality of document delivery transactions.

15. The non-transient computer-readable storage medium of claim 13, wherein the program instructions further comprise instructions computer-executable to implement, identifying parties requesting respective ones of the plurality of document delivery transactions; and ranking the parties with respect to a conversion efficiency of the respective ones of the plurality of document delivery transactions.

* * * * *